United States Patent
Blais et al.

(10) Patent No.: US 12,112,159 B1
(45) Date of Patent: *Oct. 8, 2024

(54) SYSTEM AND METHODS FOR STAGING DATA AND UPDATING VEHICLE MODULES USING STAGED DATA

(71) Applicant: Integrated Engineering, LLC, Salt Lake City, UT (US)

(72) Inventors: Peter Anthony Blais, Park City, UT (US); Damon Earl, Bountiful, UT (US); Chelsea Montana Throne, Riverton, UT (US)

(73) Assignee: Integrated Engineering, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/619,123

(22) Filed: Mar. 27, 2024

Related U.S. Application Data

(60) Provisional application No. 63/594,016, filed on Oct. 29, 2023.

(51) Int. Cl.
*G06F 8/65* (2018.01)
*G06F 11/07* (2006.01)
*G06F 11/14* (2006.01)

(52) U.S. Cl.
CPC ............ *G06F 8/65* (2013.01); *G06F 11/0766* (2013.01); *G06F 11/1433* (2013.01)

(58) Field of Classification Search
CPC ..... G06F 11/1433; G06F 11/0766; G06F 8/65
See application file for complete search history.

(56) References Cited

U.S. PATENT DOCUMENTS

| | | | | |
|---|---|---|---|---|
| 2009/0119657 A1* | 5/2009 | Link, II | ................... | G06F 8/64 717/171 |
| 2011/0320089 A1* | 12/2011 | Lewis | ................ | G01C 21/3896 380/278 |
| 2015/0088370 A1* | 3/2015 | Vangelov | ............. | G07C 5/0858 701/33.2 |
| 2015/0277942 A1* | 10/2015 | Rork | ................... | G06F 9/44505 701/31.4 |
| 2023/0084842 A1* | 3/2023 | Ng | ............................ | G06F 8/65 701/32.7 |

* cited by examiner

*Primary Examiner* — Phillip H Nguyen
(74) *Attorney, Agent, or Firm* — Scale LLP

(57) ABSTRACT

Disclosed are methods, systems, and non-transitory computer readable memory for updating vehicle modules. For instance, a system may include: a user interface device configured to: receive and store a re-program file; and display a graphical user interface configured to receive a user input to initiate a re-program process for at least one onboard module of a vehicle. The system may also include a programming device configured to be physically and communicably coupled to an onboard port of the vehicle. The programming device may be configured to: receive, via a defined sequence of messages with the user interface device, and store, via defined operations with a local cache, mapping-and-byte data; re-program the at least one onboard module using the mapping-and-byte data; and in response to determining a checksum condition is satisfied, transmit a re-program success message to the user interface device.

18 Claims, 20 Drawing Sheets

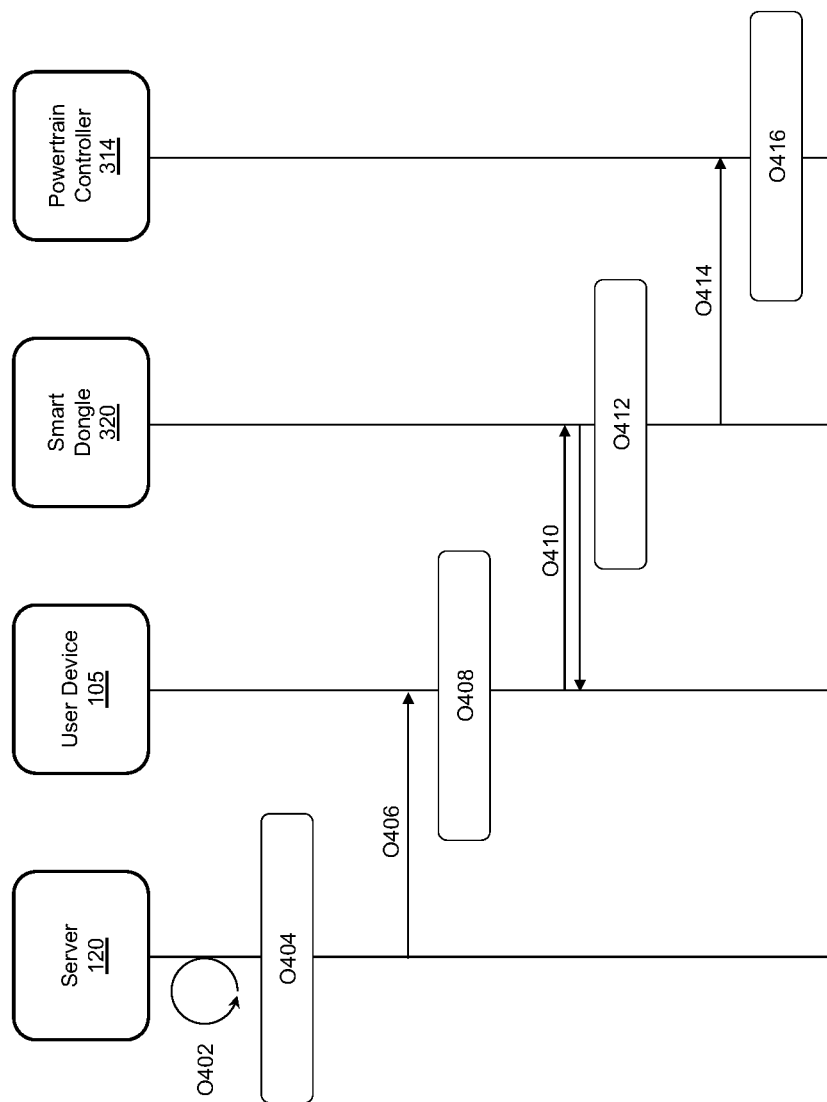

SYSTEM AND METHODS FOR STAGING DATA AND UPDATING VEHICLE MODULES USING STAGED DATA

CROSS-REFERENCE TO RELATED APPLICATION(S)

This application claims the benefit of priority under 35 U.S.C. §§ 120 and 119(e) of U.S. Provisional Application No. 63/594,016, filed Oct. 29, 2023, entitled "System and Methods for Updating Vehicle Modules."

The contents of each of the above referenced applications are hereby incorporated by reference in its entirety.

TECHNICAL FIELD

Various aspects of the present disclosure relate generally to systems and methods for updating vehicle modules and, more particularly, to systems and methods for updating vehicle modules using an aftermarket programming device.

BACKGROUND

Generally, updating modules of vehicles required physically connecting to an onboard diagnostic device port and writing byte-level correct data to specific modules. In some cases, this process may damage modules or vehicle systems if the byte-level data is not precisely correct or as expected, as set by original equipment manufacturers (OEMs). In some cases, if the byte-level data is not precisely correct or timely, the OEM module may shut down, restart, or decline to proceed with the update process. Thus, there is a need for systems and methods that can update vehicle modules with high fidelity and within operational parameters of OEM modules.

The present disclosure is directed to overcoming one or more of these above-referenced challenges.

SUMMARY OF THE DISCLOSURE

According to certain aspects of the disclosure, systems, methods, and computer readable memory are disclosed for updating vehicle modules.

In some cases, a system for staging data and updating vehicle modules may include: a user interface device and a programming device. The user interface device may be configured to: receive and store a re-program file from a server; and display a graphical user interface configured to receive a user input to initiate a re-program process for at least one onboard module of a vehicle. The programming device may be configured to be physically and communicably coupled to an onboard port of the vehicle, and the onboard port may be configured to be communicably coupled with the at least one onboard module. The programming device may be configured to be communicably coupled, via a wired or wireless communication, to the user interface device. The programming device may be configured to: receive, via a defined sequence of messages with the user interface device, and store, via defined operations with a local cache, one or combinations of: data checksum map metadata, protocol map metadata, data checksum map information, protocol map information, and a data map (collectively, mapping-and-byte data); in response to receiving an instruction message from the user interface device, re-program the at least one onboard module using the mapping-and-byte data; and in response to determining a checksum condition is satisfied, transmit a re-program success message to the user interface device.

In some cases, a computer-implemented method for staging data and updating vehicle modules using staged data may include: receiving, via a defined sequence of messages with a user interface device, and store, via defined operations with a local cache, one or combinations of: data checksum map metadata, protocol map metadata, data checksum map information, protocol map information, and a data map (collectively, mapping-and-byte data); in response to receiving an instruction message from the user interface device, re-programming at least one onboard module using the mapping-and-byte data; and in response to determining a checksum condition is satisfied, transmitting a re-program success message to the user interface device.

In some cases, a non-transitory computer readable memory may be configured to store instructions that, when executed by at least one processor, cause the at least one processor to perform a method for staging data and updating vehicle modules using staged data. The method may include: receiving, via a defined sequence of messages with a user interface device, and store, via defined operations with a local cache, one or combinations of: data checksum map metadata, protocol map metadata, data checksum map information, protocol map information, and a data map (collectively, mapping-and-byte data); in response to receiving an instruction message from the user interface device, re-programing at least one onboard module using the mapping-and-byte data; and in response to determining a checksum condition is satisfied, transmitting a re-program success message to the user interface device.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

FIG. 4 depicts a flowchart of an exemplary routine for updating vehicle modules.

DETAILED DESCRIPTION

Figure 1:
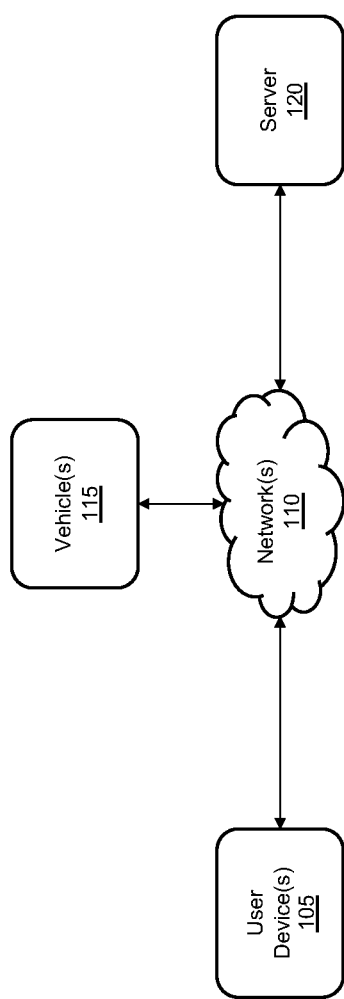
FIG. 1 depicts an example environment for updating vehicle modules.

Various aspects of the present disclosure relate generally to updating vehicle modules. In some cases, the systems of the present disclosure may include a user interface device and a programming device.

In some cases, the user interface device may be configured to: receive and store a re-program file; and display a graphical user interface configured to receive a user input to initiate a re-program process for at least one onboard module of a vehicle. For instance, the user interface device may receive the re-program file from a server that hosts re-program files, so that users may receive curated and verified re-program files that can be used to update a vehicle's modules without damaging the modules and/or properly navigate re-programing operations of OEM modules. The programming device may be configured to be physically and communicably coupled to an onboard port of the vehicle. For instance, the programming device may be a smart dongle that interfaces with an OBD 2 port and includes a processor and a local memory storage. The processor may execute operations to write specific byte strings (of re-program files) to specific memory addresses of modules of the vehicle. The onboard port may be configured to be communicably coupled with the at least one onboard module, to thereby pass the specific byte strings and related data to the module.

In some cases, the programming device may be configured to be communicably coupled, via a wired or wireless communication, to the user interface device. For instance, the programming device may be coupled by ethernet or USB (if physically wired) or coupled by WIFI or Bluetooth such as Bluetooth low energy (if wirelessly connected).

The programming device may be configured to: receive, via a defined sequence of messages with the user interface device, and store, via defined operations with a local cache, one or combinations of: data checksum map metadata, protocol map metadata, data checksum map information, protocol map information, and a data map (collectively, mapping-and-byte data). The defined sequence of messages may provide specific portions of a re-program file, so that the defined operations may store relevant data. The defined operations may ensure data integrity of specific byte-strings, so that when the programming device communicates specific write instructions to a module, the specific byte-strings are provided in a manner that reduces damage to vehicle modules/systems. For instance, the defined operations may perform additional checksums with each byte-string, in addition to Bluetooth or WIFI level message checksums. In this manner, staging update data for a module may avoid bit-flipping while receiving, caching, and loading data into a processor.

Next, the programming device may re-program the at least one onboard module using the mapping-and-byte data. In some cases, the programming device may re-program the module in response to receiving an instruction message from the user interface device or in response to a determination that the processor is staged with the mapping-and-byte data. The programming device may perform a staging process to ensure the byte data and operations are ready (e.g., loaded in processor memory and checksum verified) for the re-program process.

In response to determining a checksum condition is satisfied, the programming device may transmit a re-program success message to the user interface device. For instance, the programming device may determine an operation queue is empty and that checksums from the module match expected checksums loaded in processor memory.

Traditionally, the transfer of data to OBD modules for the purpose of reprogramming the modules often depends on the process of feeding a module many small strings of information. Each string is generally preceded by a request transmission from the module, and followed by an acknowledgement, although the acknowledgement may not always be provided. In most cases, there may also be "keep alive" messages and the like. When each entire "block" of data, consisting of a large quantity of shorter strings of data bytes, is transferred, the module and a reprogramming tool exchange a "checksum" of the data to ensure the correctness of the transfer. Usually, a programming module communicates these small strings of data via the OBD Port and handles all of the related requests, acknowledgments, and other keep alive communications directly. Due to communications problems, wired or wireless, it is possible for bits or bytes to be scrambled, and the data is not accepted by the module being programmed. This results in a failure of programming, which can damage the module. Thus, traditional re-programming can be frustrating for users and/or cause damage to modules and the like.

In contrast, the present disclosure describes methods and systems to relocate reprogramming-related processing directly to the OBD data port physical interface, using a smart dongle/programming device. The data is transferred in it's entirety (in one or more messages) via any method to the smart dongle/programming device. Only when the data has been completely transferred and checksum verified, the smart dongle/programming device may directly program the module from the OBD connector. Thus, the smart dongle/programming device may eliminate or reduce failures in programming from data transmission errors.

For instance, in the disclosed system, the use of checksums plays a pivotal role in ensuring the integrity of the data being transferred to the vehicle module during the update process. Checksums are a form of redundancy check, a simple way to detect errors in data. They are used to ensure the integrity of the data being sent and received, by providing a way to check the data for errors without needing to understand the data itself.

In the context of updating vehicle modules, improper or corrupted data can potentially cause serious issues, including breaking the module or causing it to function incorrectly. This could lead to vehicle malfunctions or safety issues. Therefore, it is of utmost priority to ensure that the data being transferred to the vehicle module is accurate and intact.

The smart dongle 320, as described in the system, performs additional checksums with each byte-string of the re-program file, in addition to communication level message checksums. This is done during the data staging process, where the smart dongle 320 receives the re-program file from the user device 105 via a defined sequence of messages. The smart dongle 320 then stores the data in its local cache through defined operations. This process ensures the data integrity of specific byte-strings, so that when the smart dongle 320 communicates specific write instructions to a module, the specific byte-strings are provided in a manner that reduces the risk of damaging the vehicle modules or systems.

Furthermore, the smart dongle 320 verifies the checksums of the data during the loading process, where it loads the data from the local cache into its processor. The smart dongle 320 determines whether all data for the instruction has been received and whether the instruction checksum matches the map checksum. If the checksums match, the smart dongle 320 proceeds to transmit a confirmation/success message, indicating that the data has been successfully verified and is ready for the re-programming process. Thus, the use of checksums in this system provides a robust method of protecting the vehicle module from potential damage caused by improper data during the update process.

Bluetooth Low Energy (BLE) is a wireless communication protocol designed for short-range communication between devices. While it is energy-efficient and widely supported across many devices, it presents several challenges when used to transfer large datasets such as re-program files for vehicle modules.

One of the main challenges is the relatively low data transfer speed of BLE. It is designed for sending small amounts of data intermittently, which makes it less suitable for transferring large datasets quickly. This can lead to longer update times when re-programming vehicle modules, which may not be desirable in many scenarios.

Another challenge is ensuring the reliability of data transfer. In the context of updating vehicle modules, it is imperative that the re-program file is transferred without any errors or data corruption. However, wireless communications like BLE can be prone to interference and signal loss, which can lead to data corruption. While various error checking mechanisms such as checksums are used to detect and correct errors, these can also add to the complexity and time taken for data transfer.

BLE connections can sometimes be unstable, especially in environments with many competing signals. If a connection is lost during the transfer of a re-program file, the transfer will have to be restarted, or the file may be corrupted, leading to potential issues with the vehicle module. For instance, a corrupted file could potentially leave a vehicle inoperational requiring either module replacement or an intensive repair process.

While BLE is designed to be power-efficient, the transfer of large datasets can still consume a considerable amount of power. This can be a concern for battery-powered devices, such as some types of user interface devices or smart dongles.

In conclusion, while BLE offers many advantages such as low power consumption and widespread compatibility, these challenges can impact its effectiveness for transferring large re-program files for updating vehicle modules. Therefore, systems and methods that can mitigate these challenges, such as the use of additional checksums to ensure data integrity, or the staging of data to manage the transfer of large files, can be of great benefit.

In some case, updating Original Equipment Manufacturer (OEM) modules in vehicles can be a complex process, particularly when the schema for updates is not known. The schema for updates typically includes the specific data structures, formats, protocols, and sequences that the OEM module expects for receiving and processing update data. Without this information, it can be challenging to ensure that the update data is correctly formatted and delivered in a way that the OEM module can interpret and apply correctly.

One of the primary difficulties lies in the risk of damaging the OEM module or causing it to malfunction. If the update data is not correctly formatted according to the OEM schema, the module may not be able to interpret the data correctly. This could lead to errors in the update process, causing the module to function incorrectly or not at all. In some cases, incorrect update data could even cause irreversible damage to the module.

Another challenge is the potential for extended update times. Without knowledge of the OEM schema, it may be difficult to optimize the update process for efficiency. The update data may have to be sent in smaller chunks or at a slower rate to ensure that the module can process it correctly. This can lead to longer update times, which can be inconvenient for the user and may increase the risk of interruptions that could cause the update to fail.

Furthermore, without the OEM schema, it may be difficult to verify that the update has been applied correctly. The schema often includes information about how the module will respond to an update, such as specific confirmation messages or status codes. Without this information, it may not be possible to confirm that the update was successful, which could leave the user unsure about the status of their vehicle's modules.

Lastly, the lack of an OEM schema can make it difficult to troubleshoot issues with the update process. If an update fails or causes issues with the module's functionality, it can be challenging to diagnose the problem without detailed knowledge of how the module processes update data. This can make it more difficult to resolve issues and could potentially leave the module in a non-functional state.

In conclusion, updating OEM modules without knowing the OEM schema for updates presents several challenges, including the risk of module damage, extended update times, difficulty verifying the success of updates, and challenges in troubleshooting update issues. Therefore, systems and methods that can mitigate these challenges, such as the use of additional checksums to ensure data integrity, or the staging of data to manage the transfer of large files, can be of great benefit.

Moreover, in an additional way to mitigate the challenges unknown OEM schema, the system disclosed herein may employ a series of recovery and failure operations that are designed to handle potential errors or issues that may arise during the update process. These operations provide a robust and resilient approach to updating vehicle modules, even when the schema for updates is unknown.

During the update process, the programming device performs a sequence of operations as defined by the re-program file. Each operation in the sequence is performed and its success is determined based on whether a response (or lack thereof) from the target module matches an expected response. If an operation is determined to be successful, the programming device proceeds to the next operation in the sequence.

However, if an operation is determined to be unsuccessful, the programming device initiates a corresponding recovery operation. The purpose of the recovery operation is to attempt to correct the error or issue that caused the original operation to fail. This could involve re-sending data, adjusting the format or sequence of the data, or performing other corrective actions. The success of the recovery operation is then determined in a similar manner to the original operation.

If the recovery operation is successful, the programming device can proceed to the next operation in the sequence. However, if the recovery operation is also unsuccessful, the programming device initiates a corresponding failure operation. The failure operation is designed to handle situations where both the original operation and the recovery operation have failed. This could involve more drastic corrective actions, such as resetting the module or aborting the update process entirely.

By employing this sequence of operations, recovery operations, and failure operations, the system can effectively navigate the process of updating vehicle modules, even when the schema for updates is unknown. This approach provides a robust and resilient method for updating vehicle modules, reducing the risk of module damage or malfunction and ensuring the integrity of the update process.

In some cases, the present systems and methods may use recursive loops. For instance, as implemented in the system disclosed herein, recursive loops may offer several benefits in the context of handling sets of operations for updating vehicle modules, particularly when the schema for updates is unknown.

Recursive loops provide a robust mechanism for error handling. In the disclosed system, if an operation fails during the update process, the programming device initiates a corresponding recovery operation. If the recovery operation is also unsuccessful, the programming device initiates a corresponding failure operation. This sequence of operations, recovery operations, and failure operations, handled through recursive loops, ensures that potential errors or issues that arise during the update process are effectively managed, reducing the risk of module damage or malfunction.

Recursive loops contribute to the resilience of the update process. Even in the face of failures or errors, the system can continue to attempt recovery and failure operations, thereby avoiding abrupt termination of the update process. This resilience is particularly beneficial when dealing with unknown OEM schemas, where the risk of encountering unexpected errors or issues is higher.

Recursive loops provide flexibility in handling a variety of scenarios. Depending on the specific conditions encountered during the update process, different recovery or failure operations can be initiated. This flexibility allows the system to adapt to a wide range of potential issues, enhancing its ability to successfully update vehicle modules even in complex or unpredictable situations.

By using recursive loops to handle sets of operations, the system can efficiently manage the update process. Instead of having to manually manage each operation and its potential errors, the system can automatically handle these through the recursive loop structure. This automation can lead to a more efficient and streamlined update process.

Recursive loops also contribute to the scalability of the system. As the complexity or size of the update process increases, the recursive loop structure can easily accommodate additional operations, recovery operations, or failure operations. This scalability ensures that the system can effectively handle updates for a wide range of vehicle modules, from simple to complex.

Thus, methods and systems of the present disclosure may be improvements to computer technology and/or vehicle performance or safety, as disclosed herein.

Environment

FIG. 1 depicts an example environment 100 for updating vehicle modules. The environment 100 may include one or more networks 110, one or more user devices 105, one or more vehicles 115, and a server 120, each of which may be described herein. Generally, the environment 100 depicts devices/interactions for updating vehicle modules.

The user device(s) 105 may (hereinafter "user device 105" for ease of reference) may be a personal computing device, such as a cell phone, a tablet, a laptop, or a desktop computer. In some cases, the user device 105 may be an extended reality (XR) device, such as a virtual reality device, an argument reality device, a mixed reality device, and the like. In some cases, the user device 105 may be associated with a user (e.g., a driver or passenger of a vehicle). The user may have a user account associated with the user device 105 that uniquely identifies the user (e.g., within the server 120). Additional features of the user device 105 and interactions with other devices are described below.

The network(s) 110 may include one or more local networks, private networks, enterprise networks, public networks (such as the internet), cellular networks, and satellite networks, to connect the various devices in the environment 100. Generally, the various devices of the environment 100 may communicate over network(s) 110 using, e.g., network communication standards that connect endpoints corresponding to the various devices of the environment 100.

The vehicle(s) 115 ("vehicle 115" for ease of reference) may be car, truck, or off-road vehicle. In some cases, the vehicle 115 may be an electric vehicle, a fuel powered vehicle (e.g., gas or diesel), or an alternative energy source vehicle (e.g., hydrogen or otherwise). In some cases, the vehicle 115 may be an autonomous vehicles, for example, whether that be fully autonomous or semi-autonomous. In some cases, the vehicle 115 may be a snowmobile, a tank, a bulldozer, a tractor, a van, a bus, a motorcycle, a scooter, a steamroller, and/or the like. The vehicle 115 may comprise a various components, such as a control system and drive system. Specific components of interest are discussed with respect to FIG. 3. In some cases, the vehicle 115 may have a variety of sensors including both internal sensors (e.g., to measure state features, such as position, velocity, speed, acceleration, etc.), feedback sensors (e.g., of actuators and adjustable components such as a powertrain system), and external sensors to perceive their surroundings.

The server 120 may be a computer, a server or set of servers, a cloud system, or a combination of the foregoing. The server 120 may coordinate data and/or instructions between various devices of the environment 100. In particular, the server 120 may manage user data (e.g., regarding accounts, vehicles, maps, powertrain data), manage re-program files, store user data/re-program files in datastores as shown and described with respect to FIG. 2. The datastores may store and manage relevant data for user device(s) 105, relevant data for vehicle(s) 115, and the like.

Server

Figure 2:
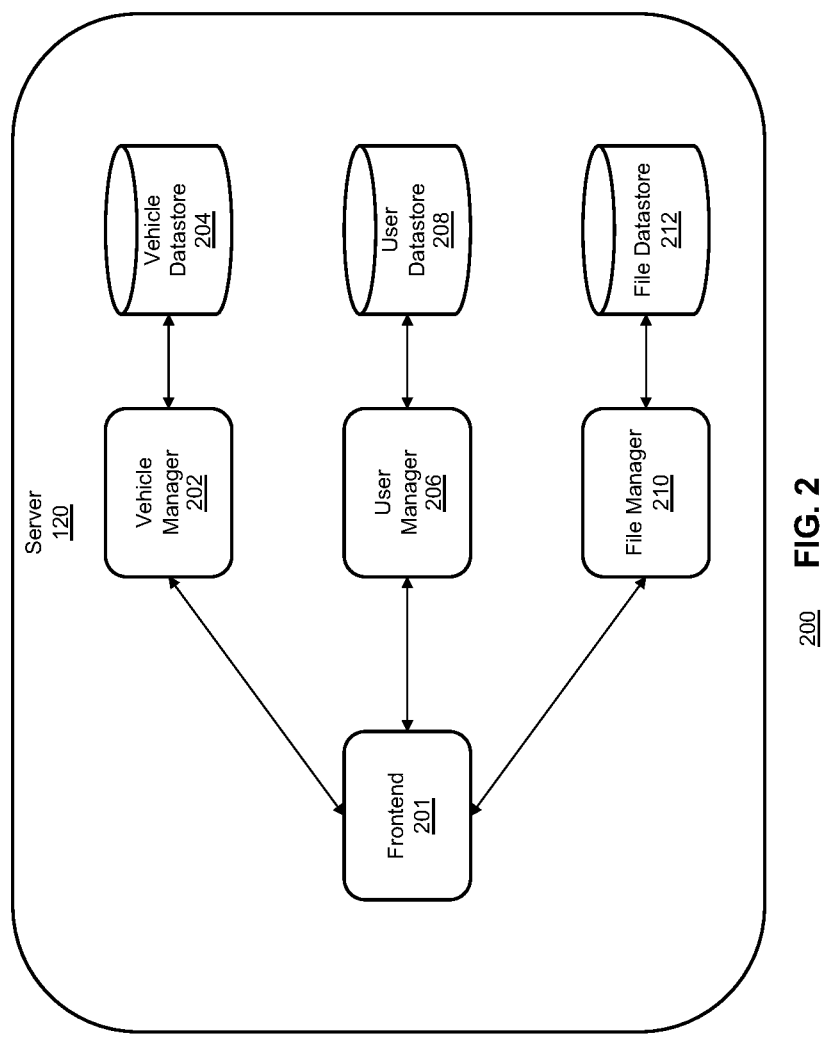
FIG. 2 depicts a block diagram of a server for updating vehicle modules.

FIG. 2 depicts a block diagram 200 of a server 120 for updating vehicle modules. Features of FIG. 2 may apply to any of FIGS. 1, 3, 4, 5A-5I, 6, 7A-7B, 8A-8C, and 9. The server 120 may include a frontend 201, a vehicle manager 202, a vehicle datastore 204, a user manager 206, a user datastore 208, a file manager 210, and/or a file datastore 212.

The frontend 201 may perform frontend processing and inbound/outbound routing of messages. The frontend 201 may be responsible for obtaining various data from users and/or vehicles, pre-process it such that the data is suitable for further processing by the other features of the server 120. In some embodiments, the frontend 201 may verify that the source of the data is a user device 105 and/or vehicle 115, e.g., registered with the server 120.

The vehicle manager 202 may manage and process data regarding vehicle(s) of user(s). The vehicle manager 202 may process and store the data in the vehicle datastore 204, such that vehicle(s) are associated with users and data regarding re-program files (e.g., installation count, success, failure, context data, and the like).

The vehicle datastore 204 may record and/or store the data regarding vehicle(s) of user(s). For instance, the vehicle datastore 204 may store the data in structured or unstructured databases, records, files, data lakes, and like.

The user manager 206 may manage and process data related to users. The user manager 206 may determine re-programming data is associated with a user by an identifier (for example, using a user identifier assigned by the server 120). For instance, the user manager 206 may determine a user device 105/vehicle 115 is associated with a user and tag inbound re-programming data with the identifier. In some cases, the re-programming data may already include the identifier. For example, the user manager 206 may query the user datastore 208 with the identifier and determine if any matches appear. If so, the user manager 206 may process responsive data (e.g., files, recommendations, instructions, and the like), and/or update/provide the responsive data (e.g., records associated with the identifier). Thus, in some cases, the server 120 may remain up-to-date regarding each user. Moreover, the server 120 may provide vehicle, module, or user-specific re-programming data, instructions, or recommendations on a vehicle, module, or user-specific basis.

The user datastore 208 may record and/or store the data related to users. For instance, the vehicle datastore 204 may store the data in structured or unstructured databases, records, files, data lakes, and like.

The file manager 210 may manage and process re-programming files. In some cases, the file manager 210 may generate, update, and send re-programming files to user devices and/or alerts regarding installed re-programming files.

The file datastore 212 may record and/or store the re-programming files. For instance, the file datastore 212 may store the data in structured or unstructured databases, records, files, data lakes, and like.

Vehicle

Figure 3:
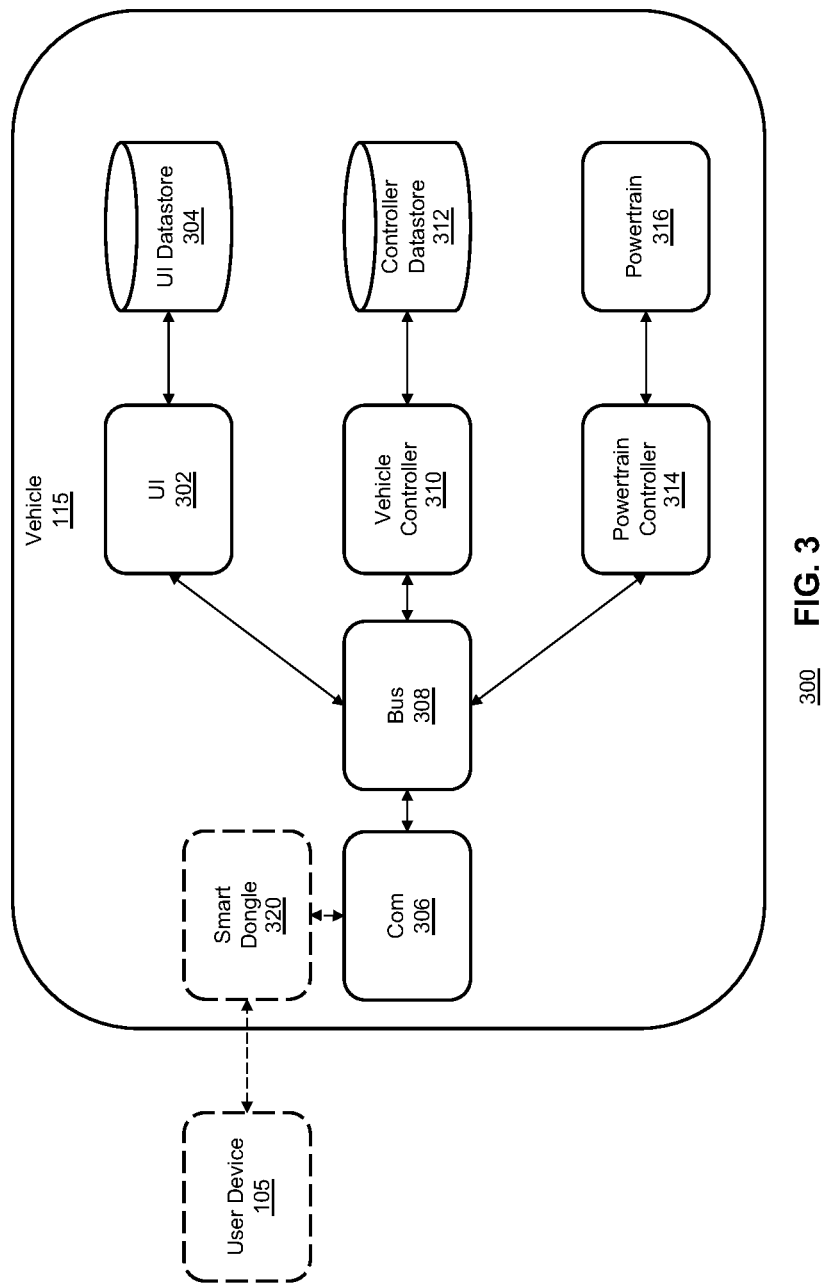
FIG. 3 depicts a block diagram of a vehicle interacting with a user device for updating vehicle modules.

FIG. 3 depicts a block diagram 300 of a vehicle 115 interacting with a user device for updating vehicle modules. Features of FIG. 3 may apply to any of FIGS. 1, 2, 4, 5A-5I, 6, 7A-7B, 8A-8C, and 9. The vehicle 115 may include a smart dongle 320 (optionally, detachable, or fixed), a communication module 306, a user interface (UI) 302, and/or the like. The vehicle 115 may also include a UI datastore 304, a bus 308, a vehicle controller 310 linked to a controller datastore 312, a powertrain controller 314, and/or a powertrain 316.

The smart dongle 320 (e.g., designed to interface with a port of an on board diagnostic device, e.g., OBD 2) may communicate with the user device 105 via wired (e.g., ethernet, USB, and the like) or wireless (e.g., WIFI, Bluetooth, and the like) communication standards. In some cases, the user device 105 may host and provide re-program files to smart dongle 320, as discussed herein.

The UI 302 may allow a user to interface with the components of the vehicle via direct interaction and/or the user device 105. The UI 302 may provide users the ability to select options as to how to adjust the vehicle settings, such as module settings. The UI datastore 304 may collect, store, and transmit information specific to any user interacting with the UI 302.

The communication module 306 may be a wireless communication system (e.g., radio, WIFI, cellular, or satellite communications). The communication module 306 may transmit data to the user device 105 and/or the server 120, and receive instructions and/or data from the user device 105 and/or the server.

Generally, the smart dongle 320 may pass data, instructions, or information from the user device 105/server 120 to the bus 308, e.g., to the vehicle controller 310 and/or powertrain controller 314 (or other modules of the vehicle). For instance, the bus 308 may format of the data, instruction, or information (using various techniques, including ethernet, OBD techniques, or serial com techniques, and the like) to match a format accepted by internal systems of the vehicle 115.

The bus 308 may relay the data, information, and instructions between various endpoints on the vehicle. In some cases, the bus 308 may implement both a bus controller and a bus interface designed based on one or more specifications of the vehicle 115 at hand.

The vehicle controller 310 may control different parts of the vehicle based on data input to the actuation controls of the vehicle, sensor data, and instructions from the controller datastore 312.

The powertrain controller 314 may manage the powertrain 316 and gather data regarding how the powertrain 316 is operating (generally, "powertrain performance"). The powertrain controller 314 may adjust the powertrain 316, e.g., based on data updated in accordance with re-programming files staged and verified by the smart dongle 320 from the user device 105. In response, the powertrain controller 314 may generate machine instructions that, when executed by powertrain hardware, update the powertrain settings accordingly. The powertrain 316 may include software and hardware components capable of executing machine instructions and adjust the powertrain settings of the vehicle. While the powertrain controller 314 and powertrain 316 are depicted as exemplary modules for re-programming, other such modules and system may be re-programmed using different re-program files.

The vehicle 115 may include one or more of the components described above. The vehicle 115 may include original equipment manufacturer (OEM) hardware designed for use by end-users, and/or after-market hardware/software to provide additional capabilities or software functions.

Routine

FIG. 4 depicts a flowchart of an exemplary routine 400 for updating vehicle modules. Features of FIG. 4 may apply to any of FIGS. 1, 2, 3, 5A-5I, 6, 7A-7B, 8A-8C, and 9.

In the routine 400, the method may be performed by one or more systems, such as the systems described with respect to FIGS. 1-3. The routine 400 may start at operation O402, where the server 120 may receive and store at least one re-program file. The re-program file may be generated and tested by engineers associated with the server 120, and uploaded to the server 120 for distribution to user devices, in response to user requests to re-programming files.

At operation O404, the server 120 may select a re-program file for transmission to a user device 105. For instance the server 120 may select a re-program file based on a user request for a specific type of action/performance, vehicle, and/or module. In some cases, re-program files may be updated, and the server 120 may determine to transmit the updated files to user devices, so that user devices 105 are ready to re-program modules of vehicles.

At operation O406, the server 120 may transmit the re-program file to user device 105. The user device 105 may receive the re-program file. In some cases, the server 120 may provide additional data or information, such as descriptions, instructions, or warnings regarding the re-program file.

At operation O408, the user device 105 may generate and display graphical user interfaces to a user. The graphical user interfaces may instruct the user on how to set up, e.g., the user device 105 and smart dongle 320 to complete a module re-program. For instance, the graphical user interfaces may instruct the user on how engage the smart dongle 320 with a port (e.g., an OBD 2 port) or connect the user device 105 and smart dongle 320 using Bluetooth low energy.

At operation O410, the user device 105 and the smart dongle 320 may perform a data transmission to receive, verify, and cache data for a module re-programming. See, e.g., FIGS. 5A-5G. For instance, the data transmission may be conducted in accordance with the defined sequence of messages to provide specific portions of the re-program file, so that the defined operations may store relevant data. The defined operations may ensure data integrity of specific byte-strings, so that when the smart dongle 320 communicates specific write instructions to a module, the specific byte-strings are provided in a manner that reduces damage to vehicle modules/systems. For instance, the defined operations may perform additional checksums with each byte-string, in addition to communication (e.g., Bluetooth or WIFI) level message checksums. In this manner, staging update data for a module may avoid bit-flipping while receiving and caching data.

At operation O412, the smart dongle 320 may load and verify data in a processor from the local cache. See, e.g., FIG. 5H. At operation O414, the smart dongle 320 may re-program a target module, such as the powertrain controller 314 (see, e.g., FIG. 6).

At operation O416, the powertrain controller 314 may write new data in accordance with messages from the smart dongle 320, requests responses, or provide feedback (e.g., checksums) and the like, to re-program the powertrain controller 314.

Staging and Verifying Data, and Loading and Verifying Data

FIGS. 5A-5I depicts dataflow diagrams 500A, 500B, 500C, 500D, 500E, 500F, 500G, 500H, and 500I for operations O501-O587 to stage and verify data for updating vehicle modules. Features of FIG. 5A-5I may apply to any of FIGS. 1, 2, 3, 4, 6, 7A-7B, 8A-8C, and 9. The operations of FIGS. 5A-5I may be performed by the smart dongle 320 and the user device 105. While the operations depicted in FIGS. 5A-5I are depicted in a defined order to provide, verify, stage, and load re-program data, the order may be re-arranged or combined based on different communication standards, storage constraints, and the like. The operations depicted in FIGS. 5A-5I may depict defined sequence of messages and defined operations in the flow diagrams 500A, 500B, 500C, 500D, 500E, 500F, 500G, 500H, and 500I.

Figure 5A:
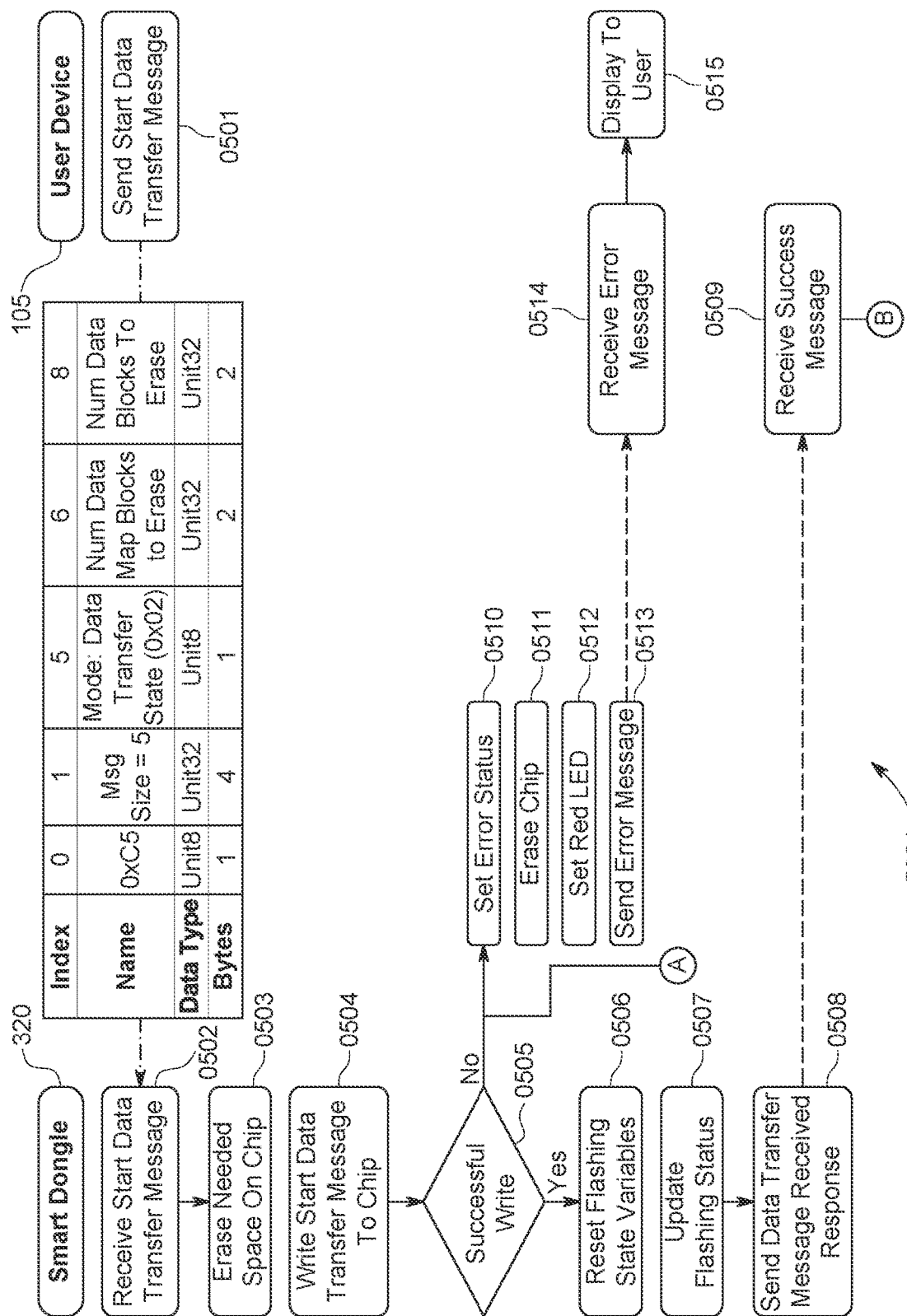
FIGS. 5A-5I depicts dataflow diagrams for operations to stage and verify data for updating vehicle modules.

In FIG. 5A, the flow diagram 500A may depict the user device 105 transmitting, at operation O501, a start data transfer message and, at operation O502 through operation O515, operations of the smart dongle 320 in response to receiving, at operation O502, the start data transfer message. For instance, the smart dongle 320 may erase, at operation O503, space on a local cache, and write, at operation O504, the start data transfer message to the local cache. The smart dongle 320 may, at operation O505, determine whether the erasing/writing was successful. Based on a successful state of erasing/writing to the local cache (operation O505: Yes), the smart dongle 320 may transmit, at operation O508, a confirmation/success message and move to point B. The user device 105 may receive, at operation O509, the confirmation/success message. In some cases, the smart dongle 320 may reset, at operation O506, flashing state variables and/or update, at operation O507, flashing status.

Based on a failure state of erasing/writing to the local cache (operation O505: No), the smart dongle 320 may transmit, at operation O513, an error message and perform other actions (e.g., set status at operation O510, erase data at operation O511, change indicator settings at operation O512, and the like). If other conditions in FIGS. 5B-5I also trigger an error state, they may return to point A to send an error message and the like. At operation O514, the user device 105 may receive the error message and, at operation O515, display a graphical user interface informing the user of the error message and, if any actions to take.

An example start data transfer message may be depicted in Table 1, below.

TABLE 1

| index | 0 | 1 | 5 | 6 | 8 |
|---|---|---|---|---|---|
| name | 0xC5 | msg size = 5 | mode: data transfer state (0x02) | num data map blocks to erase | num data blocks to erase |
| data type | unit8 | unit32 | unit8 | unit32 | unit32 |
| bytes | 1 | 4 | 1 | 2 | 2 |

Figure 5B:
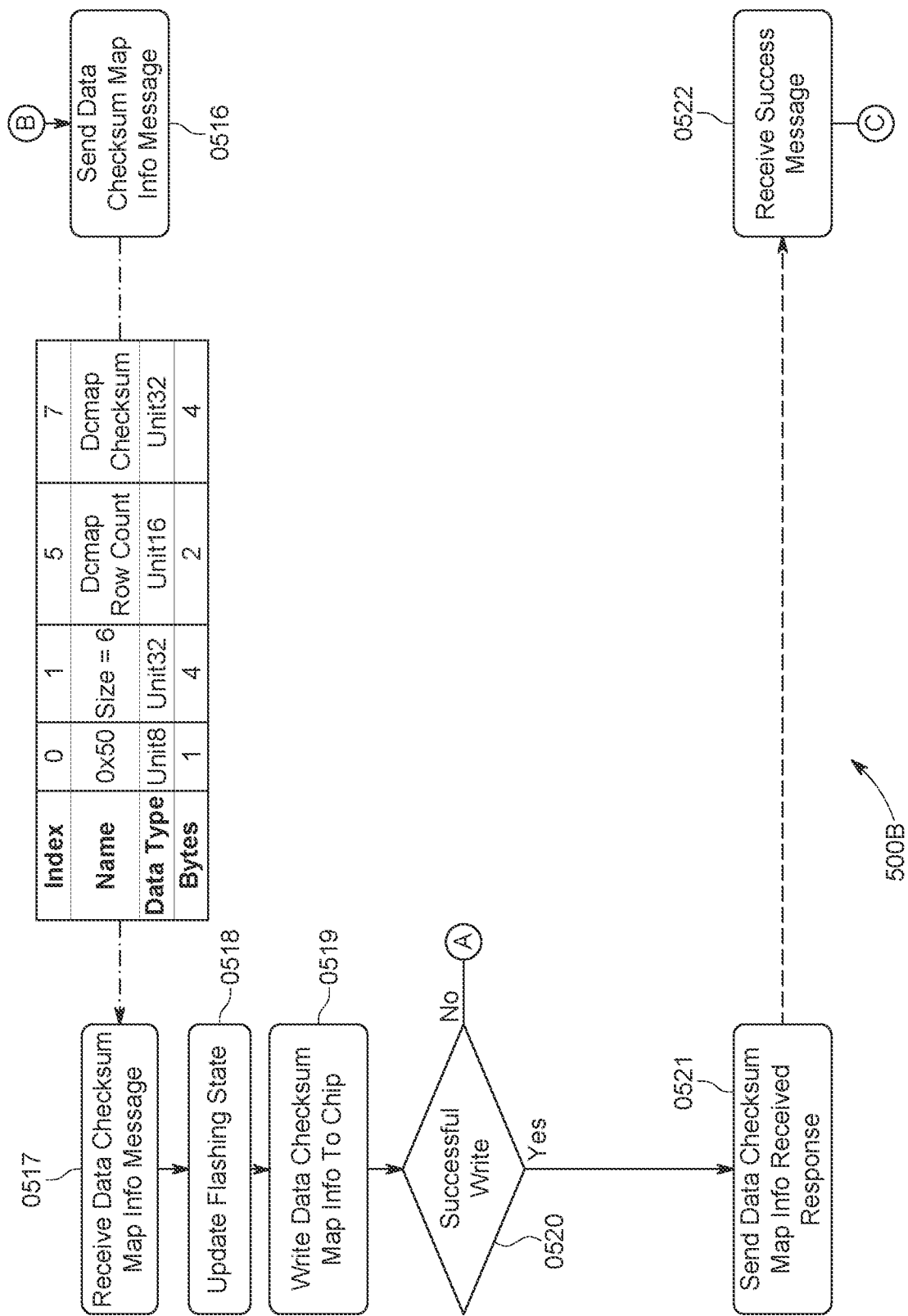

In FIG. 5B, the flow diagram 500B may depict (from point B) the user device 105 transmitting, at operation O516, a data checksum map metadata message and, at operation O516 through operation O522, operations of the smart dongle 320 in response, at operation O517, to receiving the data checksum map metadata message. For instance, the smart dongle 320 may update, at operation O518, flashing state and/or write, at operation O519, data checksum map metadata to the local cache. The smart dongle 320 may, at operation O520, determine whether the writing was successful. Based on a successful state of writing to the local cache (operation O520: Yes), the smart dongle 320 may transmit, at operation O521, a confirmation/success message and move to point C. The user device 105 may receive, at operation O522, the confirmation/success message. Based on a failure state of writing to the local cache (operation O520: No), the smart dongle 320 may go to point A and transmit an error message.

An example data checksum map metadata message may be depicted in Table 2, below.

TABLE 2

| index | 0 | 1 | 5 | 7 |
|---|---|---|---|---|
| name | 0x50 | size = 6 | dcmap row count | dcmap checksum |
| data type | unit8 | unit32 | unit16 | unit32 |
| bytes | 1 | 4 | 2 | 4 |

Figure 5C:
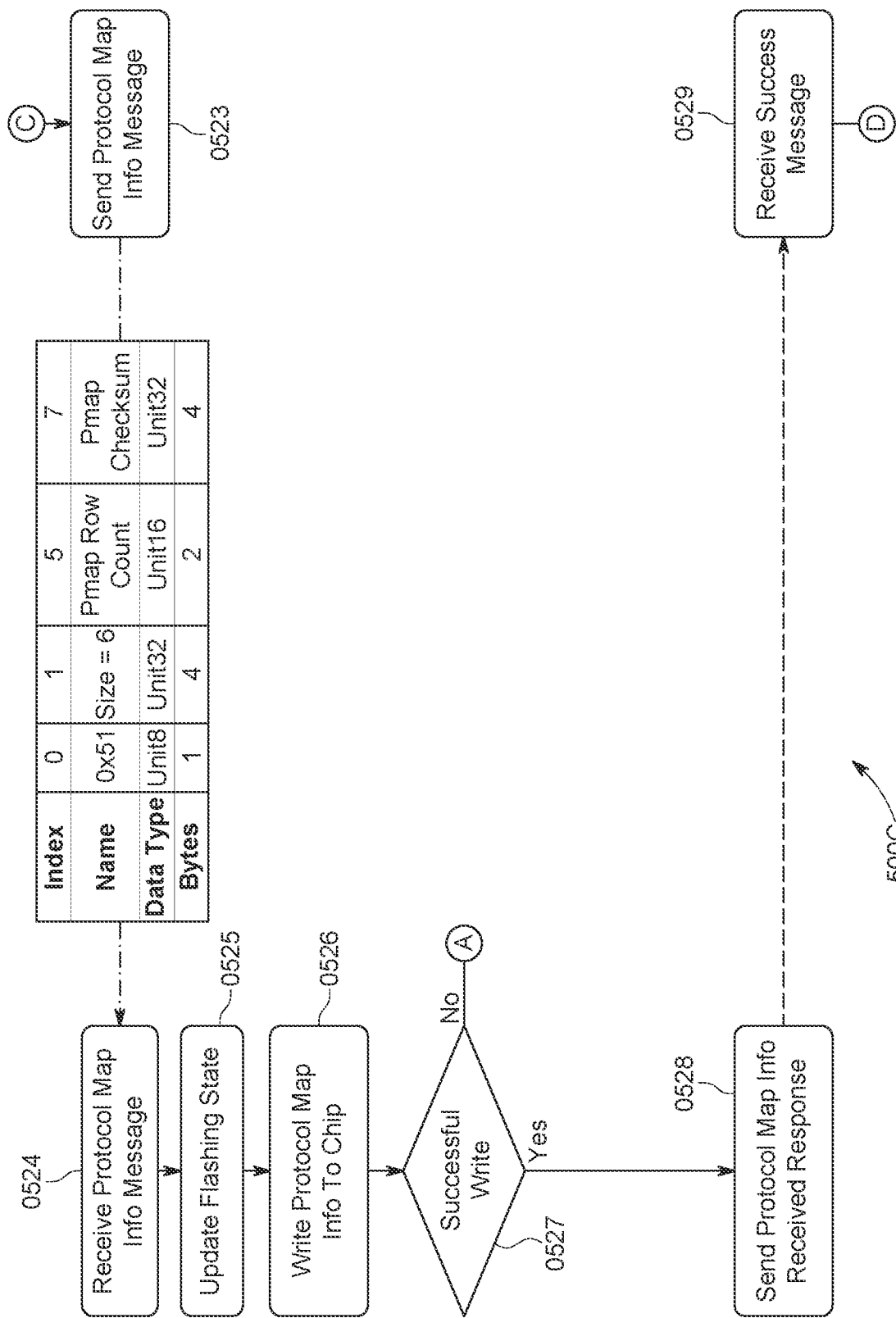

In FIG. 5C, the flow diagram 500C may depict (from point C) the user device 105 transmitting, at operation O523, a protocol map metadata message and, at operation O524 through operation O529, operations of the smart dongle 320 in response to receiving, at operation O524, the protocol map metadata message. For instance, the smart dongle 320 may update, at operation O525, flashing state and/or write, at operation O526, protocol map metadata to the local cache. The smart dongle 320 may, at operation O527, determine whether the writing was successful. Based on a successful state of writing to the local cache (operation O527: Yes), the smart dongle 320 may transmit, at operation O528, a confirmation/success message and move to point D. The user device 105 may receive, at operation O529, the confirmation/success message. Based on a failure state of writing to the local cache (operation O527: nes), the smart dongle 320 may go to point A and transmit an error message.

An example protocol map metadata message may be depicted in Table 3, below.

TABLE 3

| index | 0 | 1 | 5 | 7 |
|---|---|---|---|---|
| name | 0x51 | size = 6 | pmap row count | pmap checksum |
| data type | unit8 | unit32 | unit16 | unit32 |
| bytes | 1 | 4 | 2 | 4 |

Figure 5D:
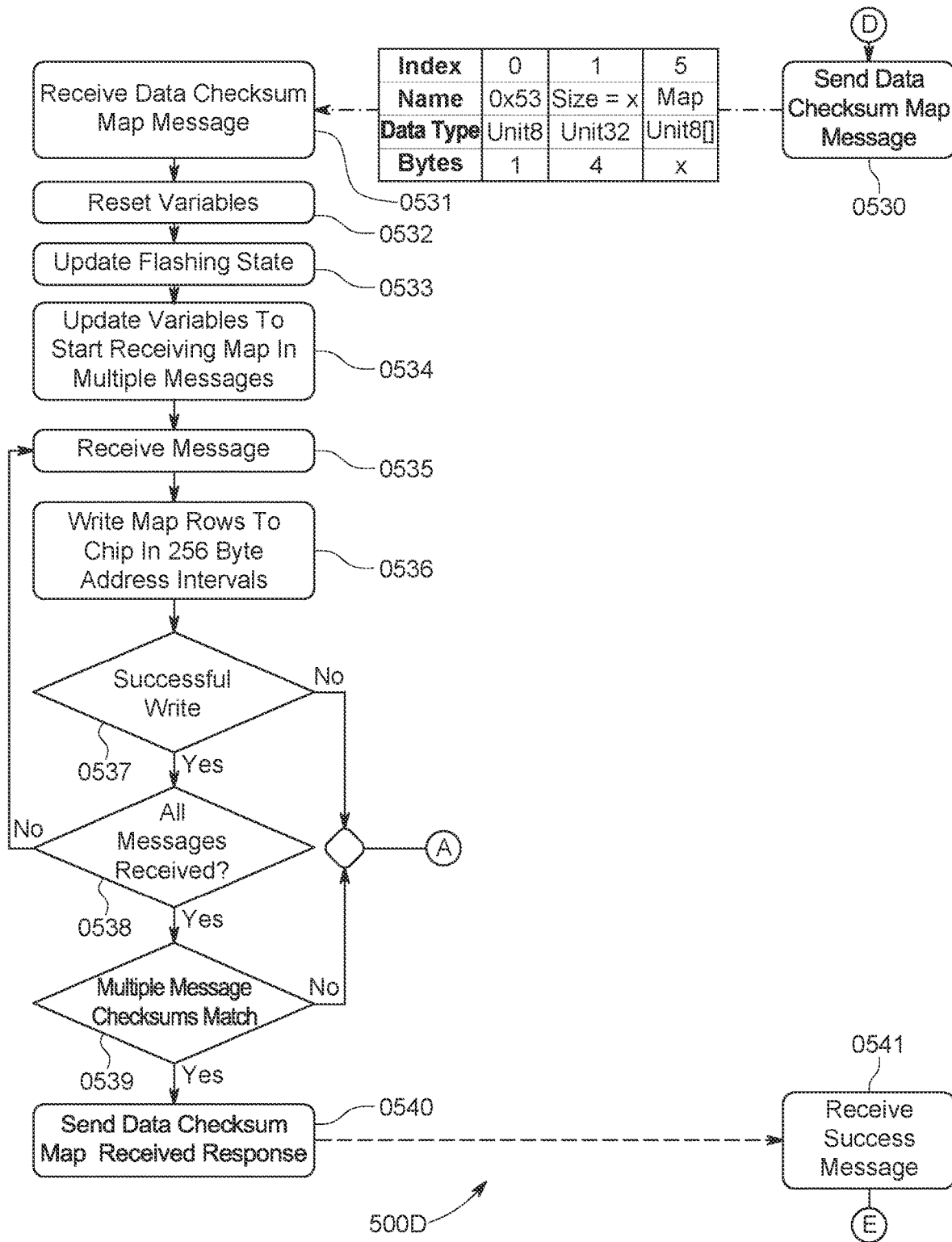

In FIG. 5D, the flow diagram 500D may depict (from point D) the user device 105 transmitting, at operation O530, a data checksum map message and, at operation O531 through operation O541, operations of the smart dongle 320 in response to receiving, at operation O531, the data checksum map message. For instance, the smart dongle 320 may reset, at operation O532, variables; update, at operation O533, flashing state; and/or write, at operation O534 through operation O539, data checksum map to the local cache. Based on a successful state of writing to the local cache and checksums verifying the written data (operation O537 and operation O539: Yes), the smart dongle 320 may transmit, at operation O540, a confirmation/success message and move to point E. The user device 105 may receive, at operation O541, the confirmation/success message. Based on a failure state of writing to the local cache or checksums not verifying the written data (operation O537 and operation O539: No), the smart dongle 320 may go to point A and transmit an error message.

In some cases (e.g., Bluetooth low energy), the data checksum map may be transmitted using more than one message. In this case, the smart dongle 320 may loop through writing checksum map data for each message and, after receiving all messages, determine the checksums verify the data. In particular, the smart dongle 320 may update, at operation O534, variables to start receiving map in multiple messages. The smart dongle 320 may receive, at operation O535, a message; write, at operation O536, map rows to local cache in 256 byte address intervals; determine, at operation O537, whether the write was successful; if operation O537 returns no, proceed to point A and transmit the error message; if operation O537 returns yes, determine, at operation O538, whether all messages have been received; if operation O538 returns no, return to receive, at operation O535, another message; if operation O538 returns yes, determine, at operation O539, whether multiple checksums match; if operation O539 returns no, proceed to point A and transmit the error message; if operation O539 returns yes, proceed to transmit a confirmation/success message.

An example data checksum map message may be depicted in Table 4, below.

TABLE 4

| index | 0 | 1 | 5 |
|---|---|---|---|
| name | 0x52 | size = x | map |
| data type | unit8 | unit32 | unit8[ ] |
| bytes | 1 | 4 | x |

Figure 5E:
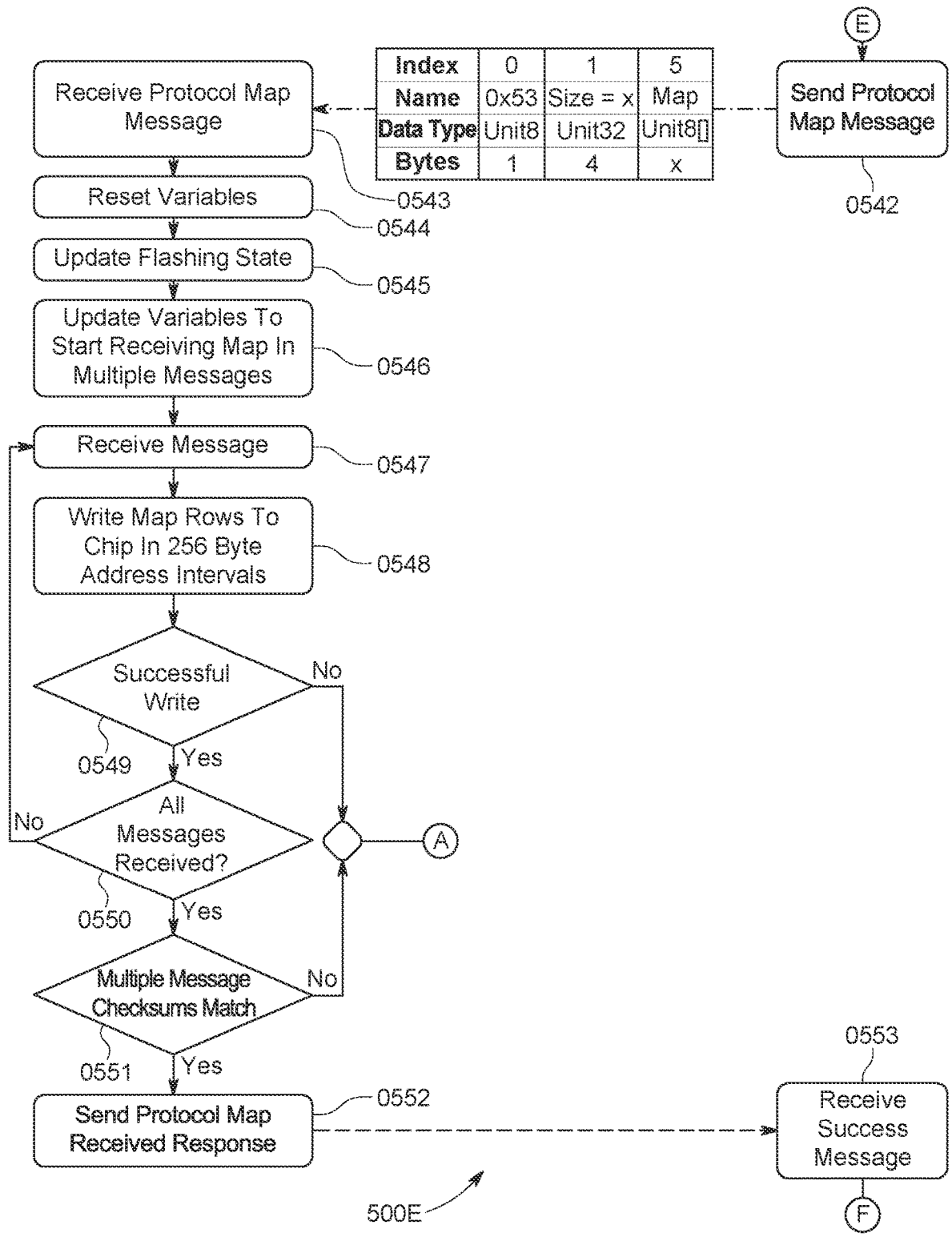

In FIG. 5E, the flow diagram 500E may depict (from point E) the user device 105 transmitting, at operation O542, a protocol map message and, at operation O543 through operation O553, operations of the smart dongle 320 in response to receiving, at operation O543, the protocol map message. For instance, the smart dongle 320 may reset, at operation O544, variables; update, at operation O545, flashing state; and/or write, at operation O546 through operation O551, protocol map to the local cache. Based on a successful state of writing to the local cache and checksums verifying the written data (operation O549 and operation O551: Yes), the smart dongle 320 may transmit, at operation O552, a confirmation/success message and move to point F. The user device 105 may receive, at operation O553, the confirmation/success message. Based on a failure state of writing to the local cache or checksums not verifying the written data (operation O549 and operation O551: No), the smart dongle 320 may go to point A and transmit an error message.

In some cases (e.g., Bluetooth low energy), the protocol map may be transmitted using more than one message. In this case, the smart dongle 320 may loop through writing map data for each message and, after receiving all messages, determine the checksums verify the data. In particular, the smart dongle 320 may update, at operation O546, variables to start receiving map in multiple messages. The smart dongle 320 may receive, at operation O547, a message; write, at operation O548, map rows to local cache in 256 byte address intervals; determine, at operation O549, whether the write was successful; if operation O549 returns no, proceed to point A and transmit the error message; if operation O549 returns yes, determine, at operation O550, whether all messages have been received; if operation O550 returns no, return to receive, at operation O547, another message; if operation O550 returns yes, determine, at operation O551, whether multiple checksums match; if operation O551 returns no, proceed to point A and transmit the error message; if operation O551 returns yes, proceed to transmit a confirmation/success message.

An example protocol map message may be depicted in Table 5, below.

TABLE 5

| index | 0 | 1 | 5 |
|---|---|---|---|
| name | 0x53 | size = x | map |
| data type | unit8 | unit32 | unit8[ ] |
| bytes | 1 | 4 | x |

Figure 5F:
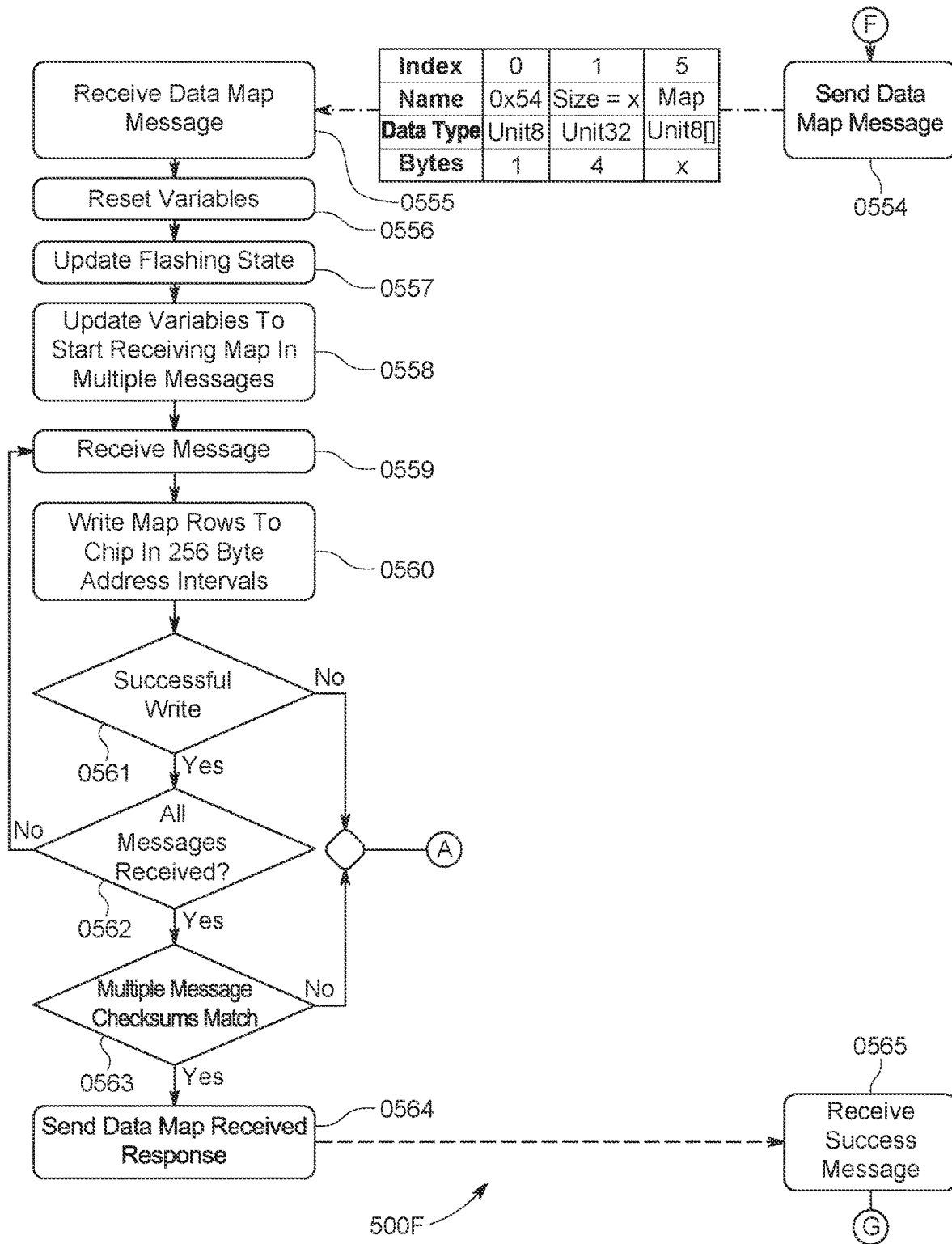

In FIG. 5F, the flow diagram 500F may depict (from point F) the user device 105 transmitting, at operation O554, a data map message and, at operation O555 through operation O565, operations of the smart dongle 320 in response to receiving, at operation O555, the data map message. For instance, the smart dongle 320 may reset, at operation O556, variables; update, at operation O557, flashing state; and/or write, at operation O558 through operation O563, data map to the local cache. Based on a successful state of writing to the local cache and checksums verifying the written data (operation O561 and operation O563: Yes), the smart dongle 320 may transmit, at operation O564, a confirmation/success message and move to point G. The user device 105 may receive, at operation O565, the confirmation/success message. Based on a failure state of writing to the local cache or checksums not verifying the written data (operation O561 and operation O563: No), the smart dongle 320 may go to point A and transmit an error message.

In some cases (e.g., Bluetooth low energy), the data map may be transmitted using more than one message. In this case, the smart dongle 320 may loop through writing data map for each message and, after receiving all messages, determine the checksums verify the data. In particular, the smart dongle 320 may update, at operation O558, variables to start receiving map in multiple messages. The smart dongle 320 may receive, at operation O559, a message; write, at operation O560, map rows to local cache in 256 byte address intervals; determine, at operation O561, whether the write was successful; if operation O561 returns no, proceed to point A and transmit the error message; if operation O561 returns yes, determine, at operation O562, whether all messages have been received; if operation O562 returns no, return to receive, at operation O559, another message; if operation O562 returns yes, determine, at operation O563, whether multiple checksums match; if operation O563 returns no, proceed to point A and transmit the error message; if operation O563 returns yes, proceed to transmit a confirmation/success message.

An example data map message may be depicted in Table 6, below.

TABLE 6

| index | 0 | 1 | 5 |
|---|---|---|---|
| name | 0x54 | size = x | map |
| data type | unit8 | unit32 | unit8[ ] |
| bytes | 1 | 4 | x |

At this point, the local cache of the smart dongle 320 has staged and verified data to re-program a target module. As described above, the data is verified using additional checksums, so as avoid bit-flipping when passing specific byte-strings. Next, in FIGS. 5G and 5H, the smart dongle 320 may load the data from the local cache into the processor and verify data before re-programming the target module.

Figure 5G:
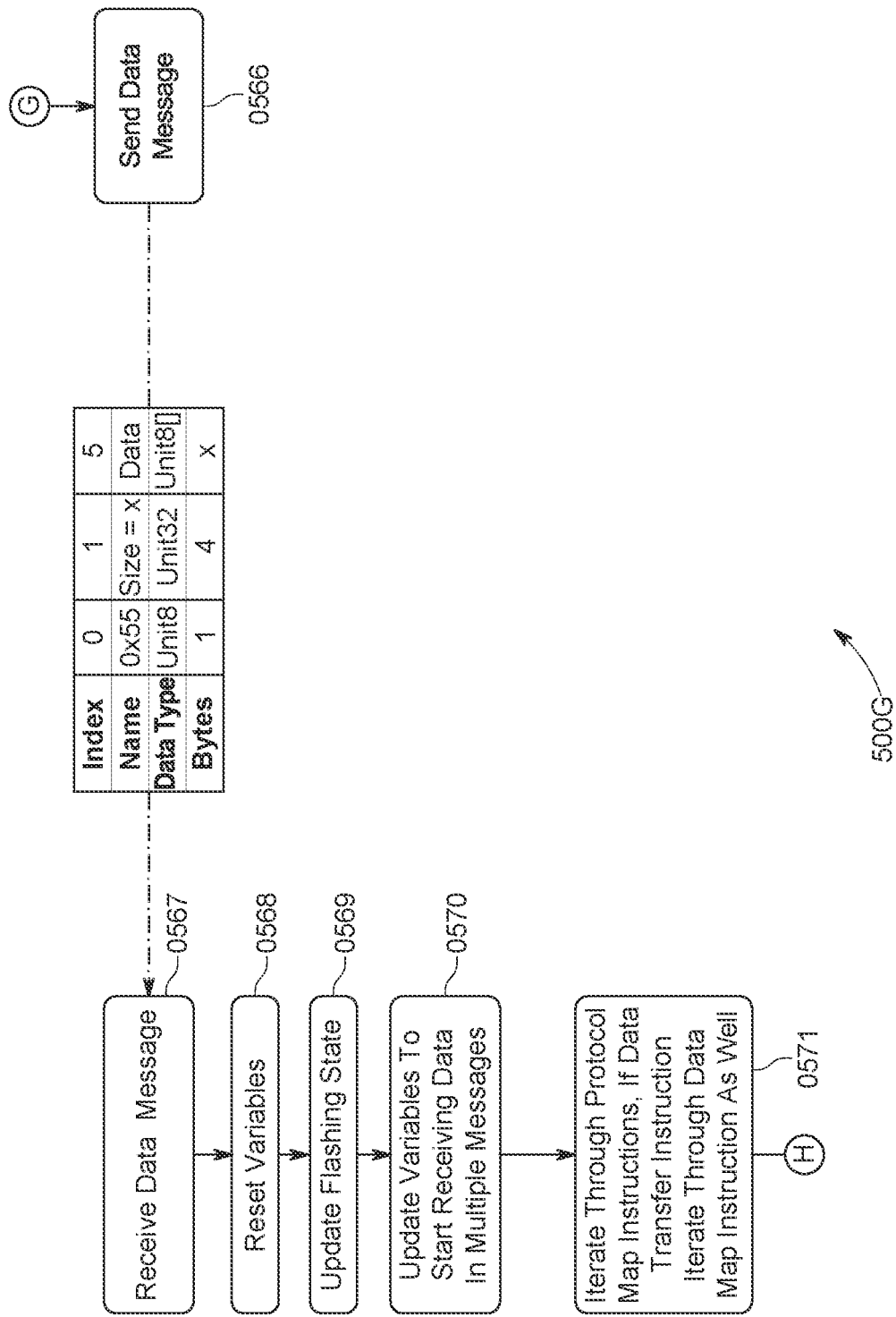

In FIG. 5G, the flow diagram 500G may depict (from point G) the user device 105 transmitting, at operation O566, a data message and, at operation O567 through operation O581, operations of the smart dongle 320 in response to receiving the data message. For instance, the smart dongle 320 may reset, at operation O568, variables; update, at operation O569, flashing state; and/or write, at operation O570 through operation O579, data from the local cache to the processor. For instance, the smart dongle 320 may first update, at operation O570, variables to start receiving data in multiple messages. The smart dongle 320 may iterate, at operation O571, through protocol map instructions and, if data transfer instructions are present, iterate through data map instructions by proceeding to point H to receive messages from local cache to the processor.

Figure 5H:
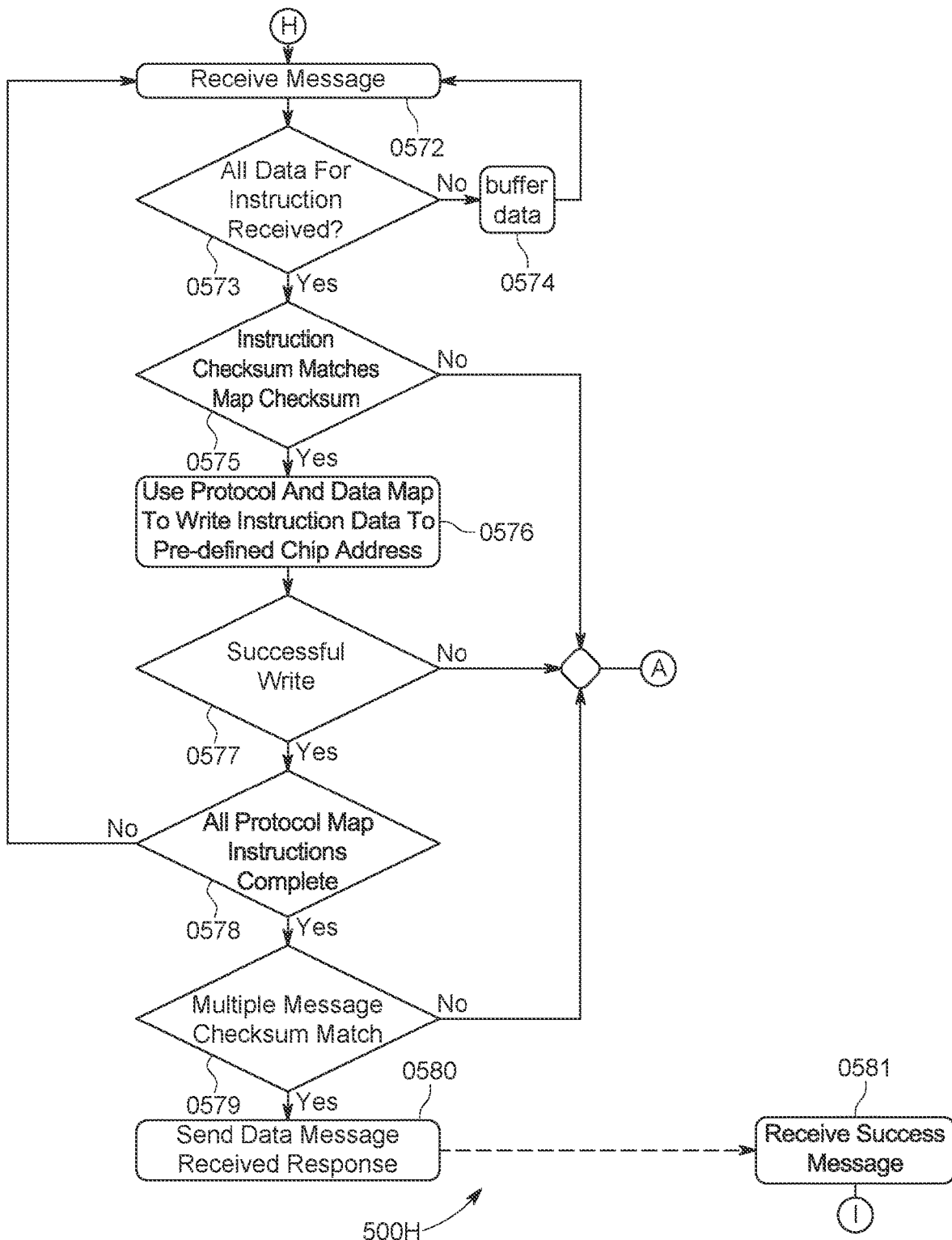

In FIG. 5H, the flow diagram 500H may depict (from point H) the processor receiving a message, at operation O572, and then load and verify data using the following:

(1) determine, at operation O573, whether all data for instruction received; if operation O573 returns no, buffer, at operation O574, until all data is received; if operation O573 returns yes, proceed.

(2) determine, at operation O575, whether instruction checksum matches map checksum; if operation O575 returns no, move to point A; if operation O575 returns yes, proceed.

(3) use, at operation O576, protocol and data map to write instruction to processor address.

(4) determine, at operation O577, if data was successfully written to processor address; if operation O577 returns no, move to point A; if operation O577 returns yes, proceed.

(5) determine, at operation O578, if all protocol map instructions are complete; if operation O578 returns no, loop to receive the next message from the local cache; if operation O578 returns yes, proceed.

(6) determine, at operation O579, if message checksums match; if operation O579 returns no, move to point A;

if operation O579 returns yes that is the checksums match, proceed to transmit, at operation O580, a confirmation/success message and move to point I. The user device 105 may receive, at operation O581, the confirmation/success message.

An example data message may be depicted in Table 7, below.

TABLE 7

| index | 0 | 1 | 5 |
|---|---|---|---|
| name | 0x54 | size = x | data |
| data type | unit8 | unit32 | unit8[ ] |
| bytes | 1 | 4 | x |

Figure 5I:
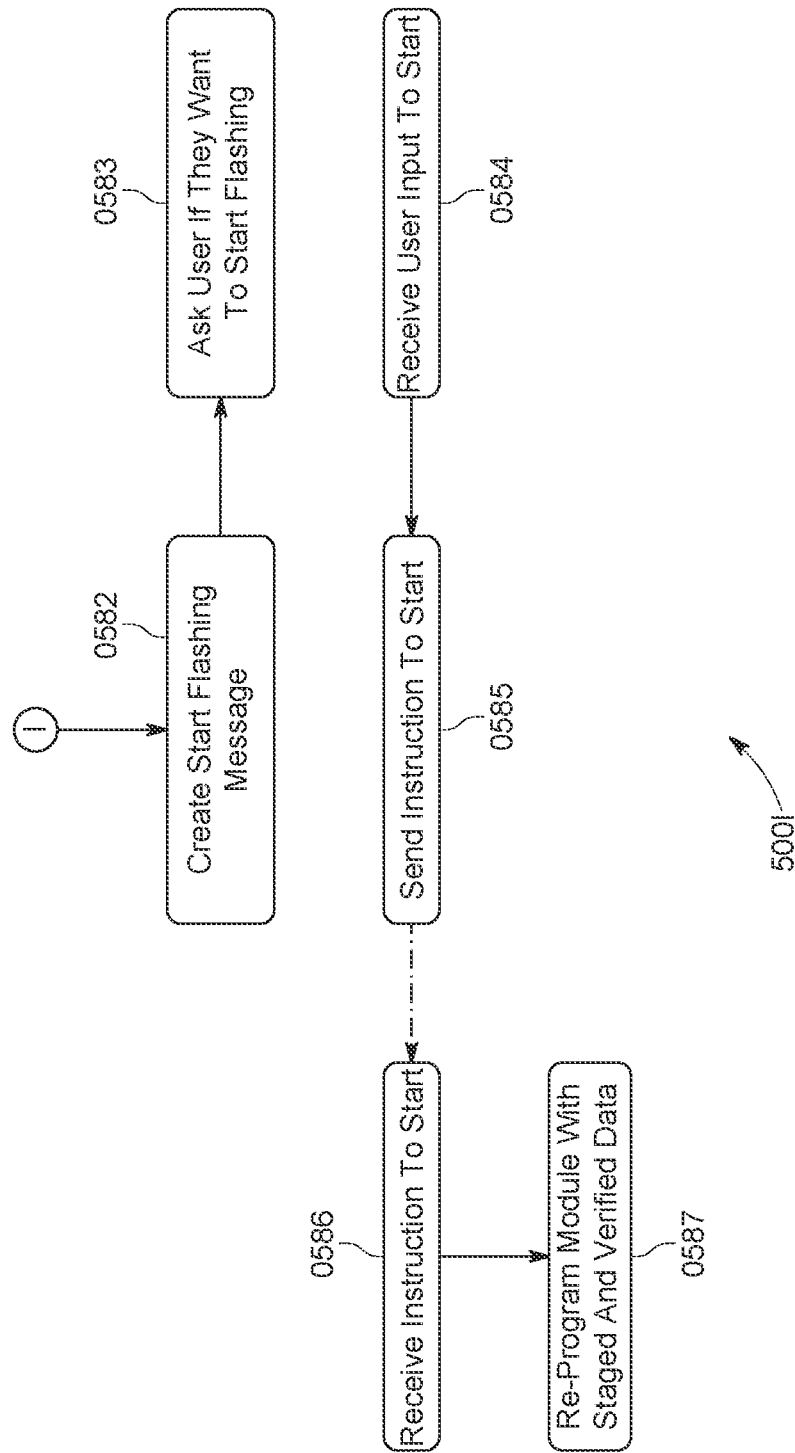

In FIG. 5I, the flow diagram 500I may depict (from point I) the user device 105 generating, at operation O582, a message and displaying, at operation O583, the message (e.g., to start flashing). In response to receiving, at operation O584, a user input to start, the user device 105 may transmit, at operation O585, an instruction to start. The smart dongle 320 may receive, at operation O586, the instruction to start and, then re-program, at operation O587, the target module with the staged/loaded and verified data. See, e.g., FIG. 6.

Updating Module

Figure 6:
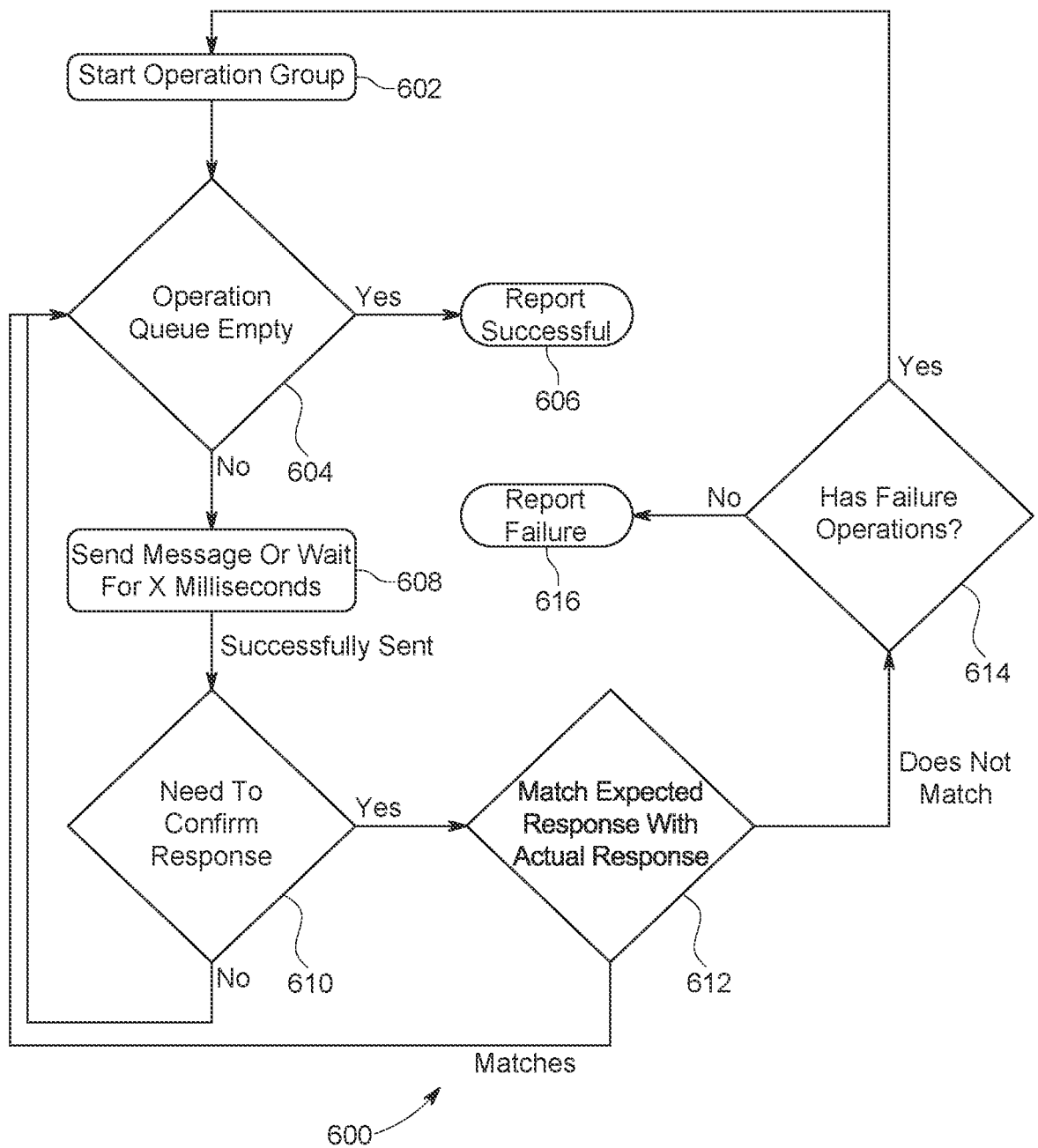
FIG. 6 depicts dataflow diagram for operations to update vehicle modules using staged and verified data.

FIG. 6 depicts a dataflow diagram 600 for operations to update vehicle modules using staged and verified data. Features of FIG. 6 may apply to any of FIGS. 1, 2, 3, 4, 5A-5I, 7A-7B, 8A-8C, and 9. The operations of FIG. 6 may be performed by the smart dongle 320 in conjunction with a target module. While the operations depicted in FIG. 6 are depicted in a defined order to re-program data, the order may be re-arranged or combined based on different module designs or communications standards.

At block 602, the smart dongle 320 may start an operation group. For instance the smart dongle 320 may generate an operation queue with at least one operation.

At block 604, the smart dongle 320 may determine whether the operation queue is empty.

At block 606, if the operation queue is empty (Block 604: Yes), the smart dongle 320 may report successful re-programming.

At block 608, if the operation queue is not empty (Block 604: No), the smart dongle 320 may select an operation (e.g., a first operation from the queue) and send message or wait a defined amount of time.

At block 610, the smart dongle 320 may determine whether to confirm response. If the confirm response is not needed (Block 610: No), the smart dongle 320 may loop back to the operation queue at block 604.

At block 612, if the confirm response is needed (Block 610: Yes), the smart dongle 320 may proceed to determine whether confirm response matches an expected actual response. For instance, the response may be a bool value (e.g., 1 or 0) and the expected value may be one of the bool values (e.g., 1). In some cases, the response may be a text string (e.g., "abcd123") and the expected value may be a known text string (e.g., "123abc"). In some cases, the smart dongle may wait for a defined number of responses and determine whether each of the responses (individually and collectively) match expected responses. In some cases, the smart dongle may match expected patterns of a response (or responses), such as wildcards or a pattern. For instance, the smart dongle may use regular expression to determine pattern matching. In some cases, the expected response may be silence (e.g., for a defined period of time). In some cases, the silence of the expected response is ended by either the module sending a response after the silence period, or the smart dongle sending a message after the silence period. If the response matches (Block 612: Matches), the smart dongle 320 may loop back to the operation queue at block 604.

At block 614, if the response does not match (Block 612: Does not Match), the smart dongle 320 may proceed to determine whether there are failure operations. If there are failure operations (Block 614: Yes), the smart dongle 320 may loop back to start an operation group for failure operations at block 602. At block 616, if there are not failure operations (Block 614: No), the smart dongle 320 may report failure.

Failure Operations

Figure 7A:
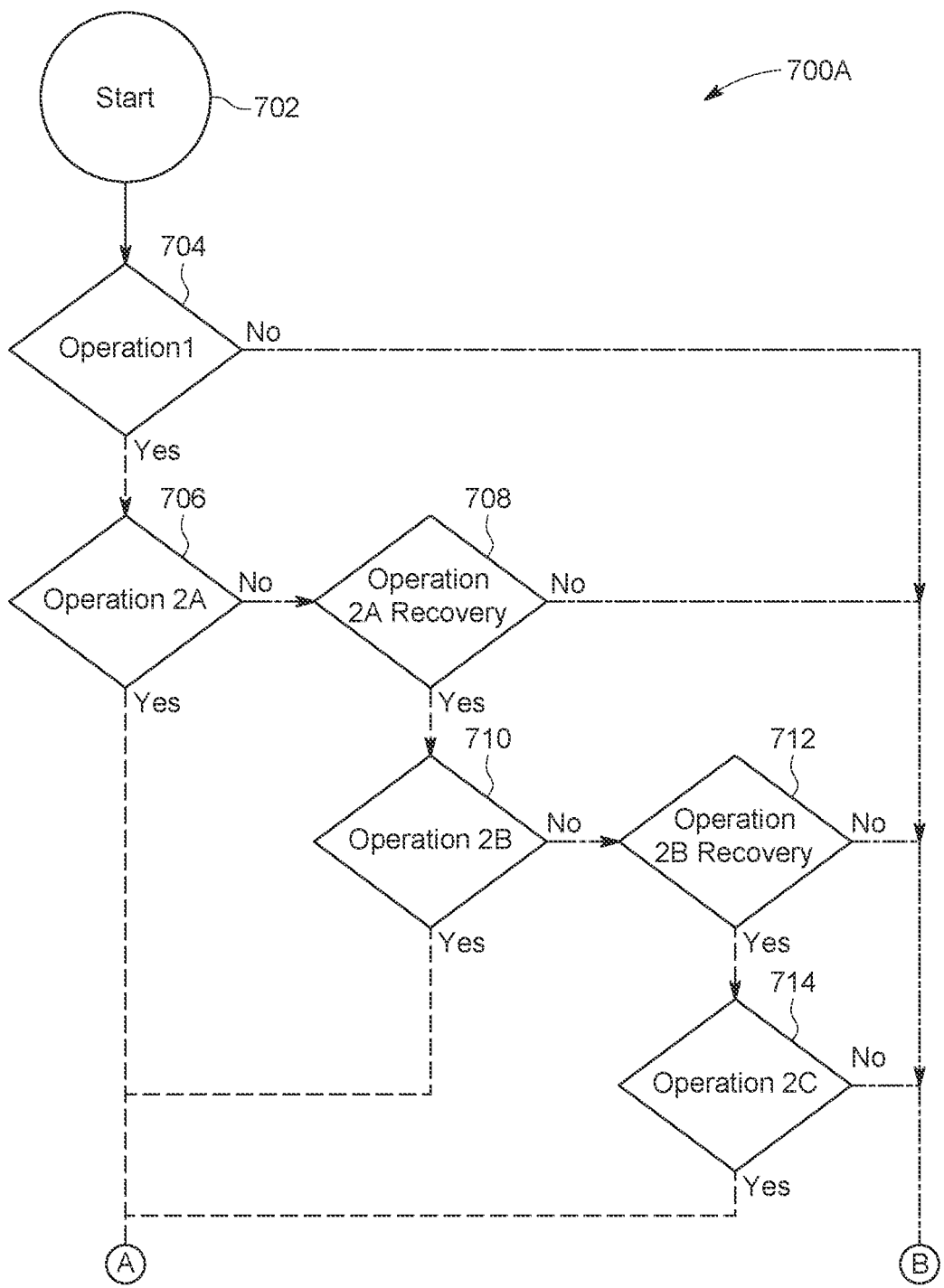
FIGS. 7A and 7B depict dataflow diagrams for operations for failure operations using staged and verified data.
Figure 7B:
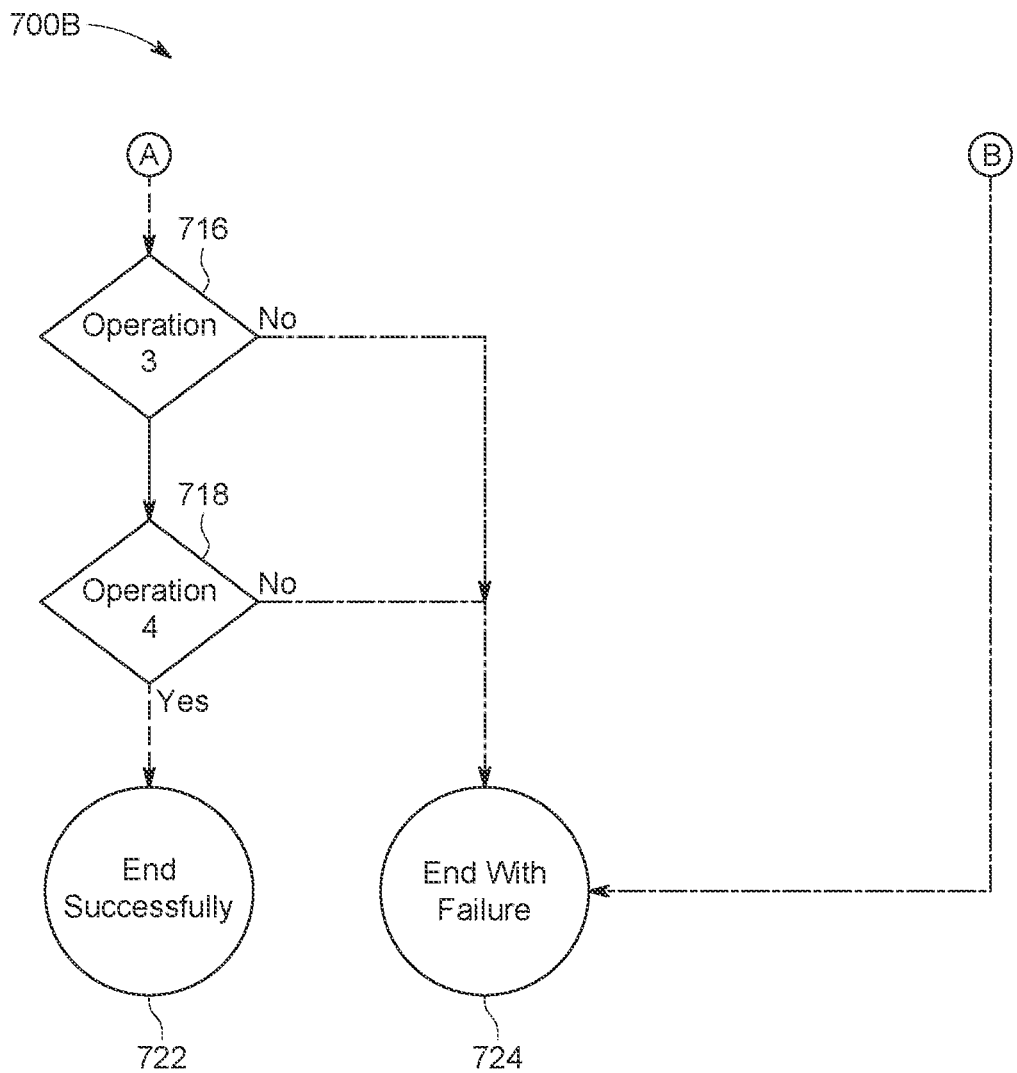

FIGS. 7A-7B depict dataflow diagrams 700A and 700B for failure operations using staged and verified data. Features of FIGS. 7A-7B may apply to any of FIGS. 1, 2, 3, 4, 5A-5I, 7, 8A-8C, and 9. The operations of FIGS. 7A-7B may be performed by the smart dongle 320 in conjunction with a target module. While the operations depicted in FIGS. 7A-7B are depicted in a defined order to re-program data, the order may be re-arranged or combined based on different module designs or communications standards.

While the dataflow diagrams 700A and 700B depict an example arrangement of operations (e.g., four main operations, and respective recovery and failure operations daisy-chained off of a second operation), the arrangement of main operations, recovery operations, and failure operations may be arbitrarily complex. In this manner, the smart dongle 320 (executing a re-program file with operation groups) may interact with different target modules, different software or different communication protocols, and the like.

In FIG. 7A, the dataflow diagram 700A may start at block 702. At block 702, the smart dongle 320 may start, e.g., an operation group. For instance, the smart dongle 320 may receive a user instruction (e.g., from user device) or determine a reprogram file is loaded in a processor the smart dongle 320.

At block 704, the smart dongle 320 may determine whether a first operation was successful. For instance, the smart dongle 320 may perform the first operation and determine whether a response (or not) from the target module was an expected response for the first operation. If the response (or not) from the target module was the expected response for the first operation, the smart dongle 320 may determine the first operation was successful. If the response (or not) from the target module was not the expected response for the first operation, the smart dongle 320 may determine the first operation was not successful. In response to determining the response (or not) from the target module was not the expected response for the first operation (block 704: no), the smart dongle 320 may proceed, via point B, to block 724.

At block 706, in response to determining the response (or not) from the target module was the expected response for the first operation (block 704: yes), the smart dongle 320 may determine whether a second operation was successful. For instance, the smart dongle 320 may perform the second operation and determine whether a response (or not) from the target module was an expected response for the second operation. If the response (or not) from the target module was the expected response for the second operation, the smart dongle 320 may determine the second operation was successful. If the response (or not) from the target module was not the expected response for the second operation, the smart dongle 320 may determine the second operation was not successful.

At block 708, the smart dongle 320 may, in response to determining the response (or not) from the target module was not the expected response for the second operation (block 706: no), the smart dongle 320 may determine whether a first recovery operation was successful. For instance, the smart dongle 320 may perform the first recovery operation and determine whether a response (or not) from the target module was an expected response for the first recovery operation. If the response (or not) from the target module was the expected response for the first recovery operation, the smart dongle 320 may determine the first recovery operation was successful. If the response (or not) from the target module was not the expected response for the first recovery operation, the smart dongle 320 may determine the first recovery operation was not successful. In response to determining the response (or not) from the target module was not the expected response for the first recovery operation (block 708: no), the smart dongle 320 may proceed, via point B, to block 724.

At block 710, in response to determining the response (or not) from the target module was the expected response for the first recovery operation (block 708: yes), the smart dongle 320 may determine whether a first failure operation was successful. For instance, the smart dongle 320 may perform the first failure operation and determine whether a response (or not) from the target module was an expected response for the first failure operation. If the response (or not) from the target module was the expected response for the first failure operation, the smart dongle 320 may determine the first failure operation was successful and, via point A, proceed to block 716. If the response (or not) from the target module was not the expected response for the first failure operation, the smart dongle 320 may determine the first failure operation was not successful.

At block 712, in response to determining the response (or not) from the target module was not the expected response for the first failure operation (block 710: no), the smart dongle 320 may determine whether a second recovery operation was successful. For instance, the smart dongle 320 may perform the second recovery operation and determine whether a response (or not) from the target module was an expected response for the second recovery operation. If the response (or not) from the target module was the expected response for the second recovery operation, the smart dongle 320 may determine the second recovery operation was successful. If the response (or not) from the target module was not the expected response for the second recovery operation, the smart dongle 320 may determine the second recovery operation was not successful. In response to determining the response (or not) from the target module was not the expected response for the second recovery operation (block 710: no), the smart dongle 320 may proceed, via point B, to block 724.

At block 714, in response to determining the response (or not) from the target module was the expected response for the second recovery operation (block 712: yes), the smart dongle 320 may determine whether a second failure operation was successful. For instance, the smart dongle 320 may perform the second failure operation and determine whether a response (or not) from the target module was an expected response for the second failure operation. If the response (or not) from the target module was the expected response for the second failure operation, the smart dongle 320 may determine the second failure operation was successful and, via point A, proceed to block 716. If the response (or not) from the target module was not the expected response for the second failure operation, the smart dongle 320 may determine the first failure operation was not successful. In response to determining the response (or not) from the target module was not the expected response for the second failure operation (block 714: no), the smart dongle 320 may proceed, via point B, to block 724.

In FIG. 7B, the dataflow diagram 700B may continue from the dataflow diagram 700A at block 716. In response to determining the response (or not) from the target module was the expected response for the second operation (block 706: yes), the smart dongle 320 may proceed, via point A, to determine whether a third operation was successful. For instance, the smart dongle 320 may perform the third operation and determine whether a response (or not) from the target module was an expected response for the third operation. If the response (or not) from the target module was the expected response for the third operation, the smart dongle 320 may determine the third operation was successful. If the response (or not) from the target module was not the expected response for the third operation, the smart dongle 320 may determine the third operation was not successful. In response to determining the response (or not) from the target module was not the expected response for the third operation (block 716: no), the smart dongle 320 may proceed to block 724.

At block 718, in response to determining the response (or not) from the target module was the expected response for the third operation (block 716: yes), the smart dongle 320 may determine whether a fourth operation was successful. For instance, the smart dongle 320 may perform the fourth operation and determine whether a response (or not) from the target module was an expected response for the fourth operation. If the response (or not) from the target module was the expected response for the fourth operation, the smart dongle 320 may determine the fourth operation was successful. If the response (or not) from the target module was not the expected response for the fourth operation, the smart dongle 320 may determine the fourth operation was not successful. In response to determining the response (or not) from the target module was not the expected response for the fourth operation (block 718: no), the smart dongle 320 may proceed to block 724.

At block 722, in response to determining the response (or not) from the target module was the expected response for the fourth operation (block 718: yes), the smart dongle 320 may determine end operation group with success. For instance, the smart dongle 320 may proceed to a next operation group (if more operation groups), or to report re-programming was successful to a user, e.g., via a user device (if no more operation groups).

At block 724, the smart dongle 320 may determine end operation group with failure. For instance, the smart dongle 320 may determine if any one branch routes to block 724 that the operation group failed in re-programming the target module and report the result to the user device.

In this manner, if the smart dongle 320 determines success at blocks 704, 706, 716, and 718, the smart dongle 320 may end an operation group with success. Moreover, even if for certain blocks the smart dongle 320 determines failure for an operation, the smart dongle 320 may proceed through recovery and failure operations (and if successful) determine an operation group was successful. Thus, recovery and failure operations may provide resiliency when performing operations with a target module. This may be important when target modules are listening to noisy communication channels, are sensitive to timing or packet size, or are locked in difficult modes of re-programming.

Flashing ECU Module

Figure 8A:
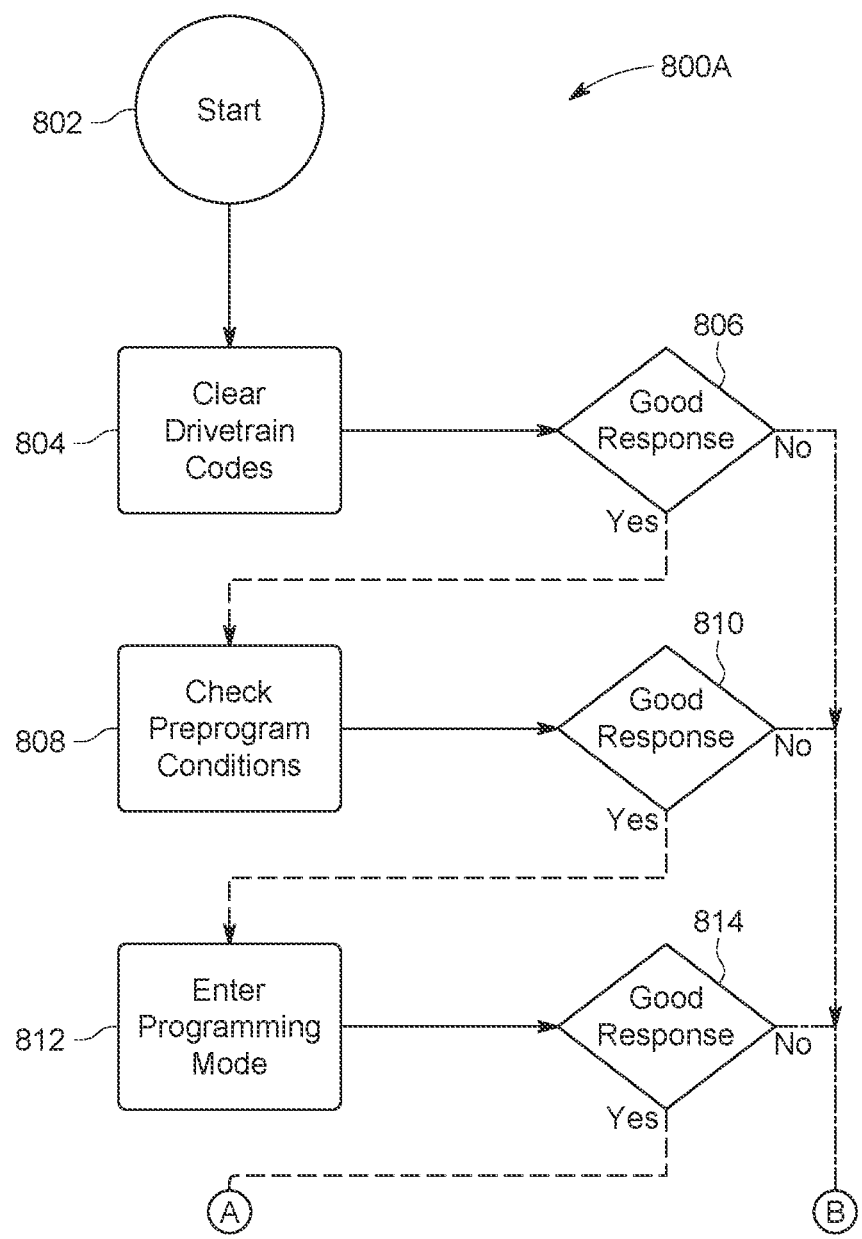
FIGS. 8A, 8B, and 8C depict dataflow diagrams for exemplary operations for flashing an ECU module.
Figure 8B:
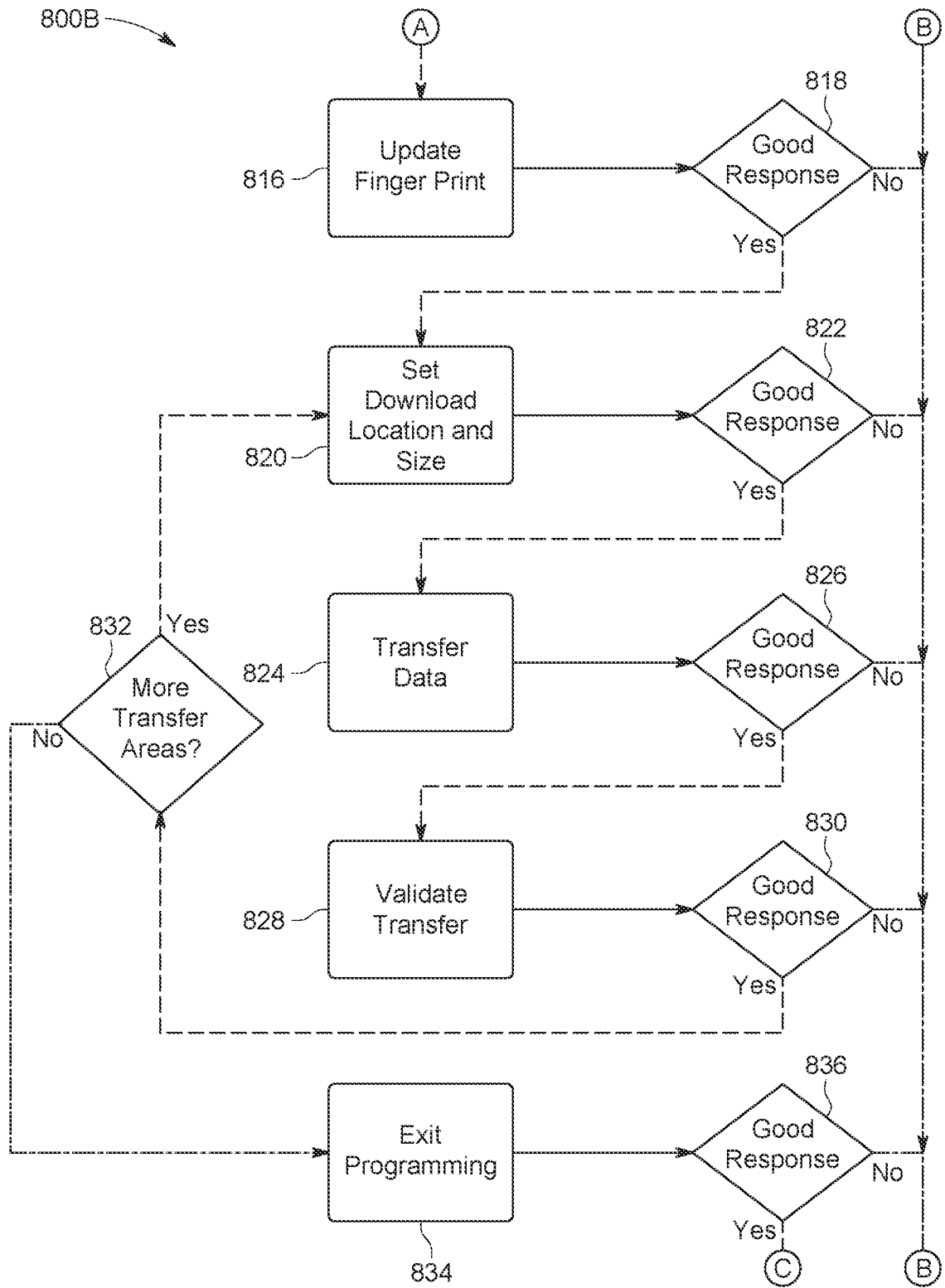
Figure 8C:
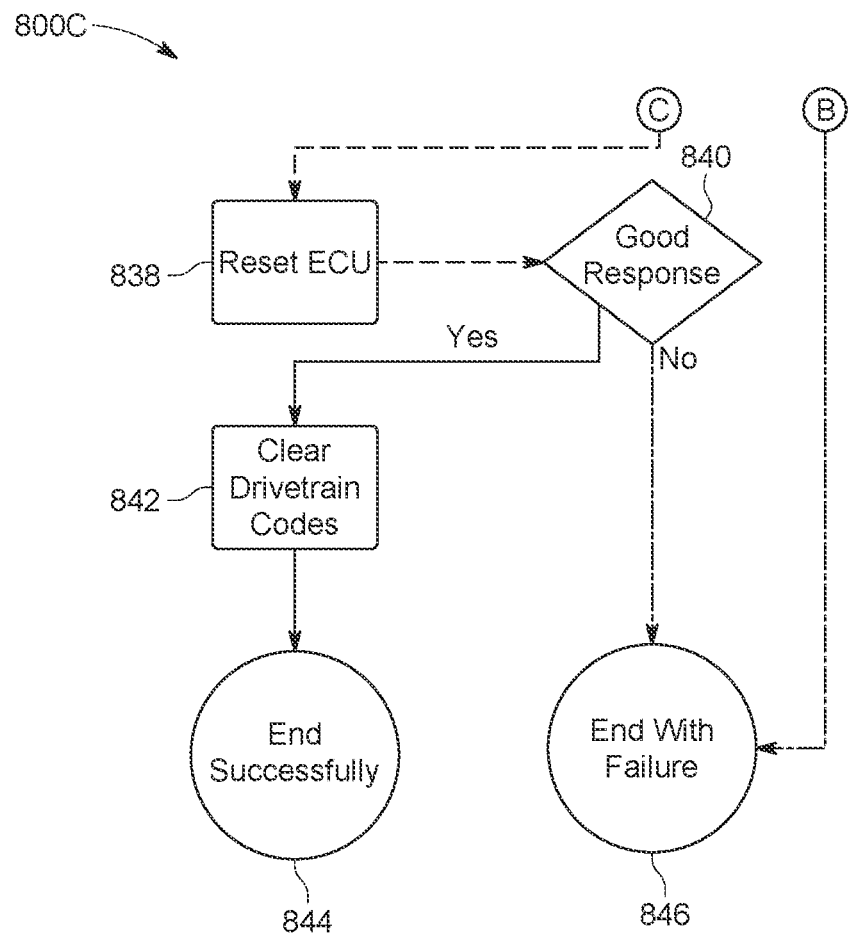

FIGS. 8A-8C depict dataflow diagrams 800A, 800B, and 800C, for exemplary operations for flashing an ECU module. Features of FIGS. 8A-8C may apply to any of FIGS. 1, 2, 3, 4, 5A-5I, 7, 7A-7B, and 9. The operations of FIG. 8A-8C may be performed by the smart dongle 320 in conjunction with a target module. While the operations depicted in FIGS. 8A-8C are depicted in a defined order to re-program data, the order may be re-arranged or combined based on different module designs or communications standards.

While the dataflow diagrams 800A, 800B, and 800C depict an example arrangement of operations, the arrangement, sequence, and types of operations may be arbitrarily complex. In this manner, the smart dongle 320 (executing a re-program file with operation groups) may interact with different target modules, different software or different communication protocols, and the like.

In FIG. 8A, the dataflow diagram 800A may start at block 802. At block 802, the smart dongle 320 may start, e.g., an operation group. For instance, the smart dongle 320 may receive a user instruction (e.g., from user device) or determine a reprogram file is loaded in a processor the smart dongle 320.

At block 804, the smart dongle 320 may perform a clear drivetrain codes operation. For instance, the clear drivetrain codes operation may include broadcasting a message to all drivetrain-related modules to attempt to wipe any diagnostic error codes.

At block 806, the smart dongle 320 may then proceed to determine whether a response (or no response) from the target module was acceptable. In response to determining the response (or no response) from the target module was not acceptable (block 806: no), the smart dongle 320 may proceed, via point B, to block 846 (e.g., failure).

At block 808, in response to determining the response (or no response) from the target module was acceptable (block 806: yes), the smart dongle 320 may proceed to perform a check preprogram conditions. For instance, the check preprogram conditions may include validating that the vehicle is in park with the ignition turned on.

At block 810, the smart dongle 320 may then proceed to determine whether a response (or no response) from the target module was acceptable. In response to determining the response (or no response) from the target module was not acceptable (block 806: no), the smart dongle 320 may proceed, via point B, to block 846 (e.g., failure).

At block 812, in response to determining the response (or no response) from the target module was acceptable (block 810: yes), the smart dongle 320 may proceed to perform an enter programming mode operation. For instance, the enter programming mode operation may include performing an unlocking procedure where a challenge question is answered that is not publicly documented.

At block 814, the smart dongle 320 may then proceed to determine whether a response (or no response) from the target module was acceptable. In response to determining the response (or no response) from the target module was not acceptable (block 814: no), the smart dongle 320 may proceed, via point B, to block 846 (e.g., failure).

In FIG. 8B, the dataflow diagram 800B may continue from the dataflow diagram 800A at block 816. At block 816, in response to determining the response (or no response) from the target module was acceptable (block 814: yes), the smart dongle 320 may proceed, via point A, to perform update fingerprint operation. For instance, the update fingerprint operation may include calculating a timestamp and providing the module with a tool serial number.

At block 818, the smart dongle 320 may then proceed to determine whether a response (or no response) from the target module was acceptable. In response to determining the response (or no response) from the target module was not acceptable (block 818: no), the smart dongle 320 may proceed, via point B, to block 846 (e.g., failure).

At block 820, in response to determining the response (or no response) from the target module was acceptable (block 818: yes) or from block 832, the smart dongle 320 may proceed to perform a set download location and size operation. For instance, the download location and size operation may include informing the module to prepare the area to be programmed by either mirroring or other means of preparing for data transfer into the module processor.

At block 822, the smart dongle 320 may then proceed to determine whether a response (or no response) from the target module was acceptable. In response to determining the response (or no response) from the target module was not acceptable (block 822: no), the smart dongle 320 may proceed, via point B, to block 846 (e.g., failure).

At block 824, in response to determining the response (or no response) from the target module was acceptable (block 822: yes), the smart dongle 320 may proceed to perform a transfer data operation. For instance, the transfer data operation may include sending compressed and encrypted data over a sequence of messages.

At block 826, the smart dongle 320 may then proceed to determine whether a response (or no response) from the target module was acceptable. In response to determining the response (or no response) from the target module was not acceptable (block 826: no), the smart dongle 320 may proceed, via point B, to block 846 (e.g., failure).

At block 828, in response to determining the response (or no response) from the target module was acceptable (block 826: yes), the smart dongle 320 may proceed to perform a validate transfer operation. For instance, the validate transfer operation may include having the module perform decrypting, uncompressing, and ensuring data integrity of the data previously transferred.

At block 830, the smart dongle 320 may then proceed to determine whether a response (or no response) from the target module was acceptable. In response to determining the response (or no response) from the target module was not acceptable (block 830: no), the smart dongle 320 may proceed, via point B, to block 846 (e.g., failure).

At block 832, in response to determining the response (or no response) from the target module was acceptable (block 830: yes), the smart dongle 320 may proceed to perform a transfer areas determination operation. For instance, the transfer areas determination operation may include checking if there are any additional transfer areas in the queue.

If the transfer areas determination determines that there are more transfer areas, then the smart dongle 320 may return to block 820 and repeat the loop. Thus, in response to determining no more transfer areas (block 832: yes), the smart dongle may proceed to block 820. If the transfer areas determination determines that there are no more transfer areas, then the smart dongle 320 may proceed to block 834.

At block 834, in response to determining no more transfer area (block 832: no), the smart dongle 320 may then proceed to perform an exit programming operation. For instance, the exit programming operation may include informing other modules to come back online.

At block 836, the smart dongle 320 may then proceed to determine whether a response (or no response) from the target module was acceptable. In response to determining the response (or no response) from the target module was not acceptable (block 836: no), the smart dongle 320 may proceed, via point B, to block 846 (e.g., failure).

In FIG. 8C, the dataflow diagram 800C may continue from the dataflow diagram 800B at block 838. At block 838, in response to determining the response (or no response) from the target module was acceptable (block 836: yes), the smart dongle 320 may proceed, via point C, to perform a reset ECU operation. For instance, the reset ECU operation may include triggering a simulated ignition power cycle.

At block 840, the smart dongle 320 may then proceed to determine whether a response (or no response) from the target module was acceptable. For instance, a response may be a bool value (e.g., 1 or 0) and an expected value may be one of the bool values (e.g., 1). In some cases, the response may be a text string (e.g., "abcd123") and the expected value may be a known text string (e.g., "123abc"). In some cases, the smart dongle may wait for a defined number of responses and determine whether each of the responses (individually and collectively) match expected responses. In some cases, the smart dongle may match expected patterns of a response (or responses), such as wildcards or a pattern. For instance, the smart dongle may use regular expression to determine pattern matching. In some cases, the expected response may be silence (e.g., for a defined period of time). In some cases, the silence of the expected response is ended by either the module sending a response after the silence period, or the smart dongle sending a message after the silence period. In response to determining the response (or no response) from the target module was not acceptable (block 840: no), the smart dongle 320 may proceed to block 846 (e.g., failure).

At block 842, in response to determining the response (or no response) from the target module was acceptable (block 840: yes), the smart dongle 320 may proceed to perform a clear drivetrain codes operation. For instance, the clear drivetrain codes operation may include broadcasting a message to all drivetrain-related modules to attempt to wipe any diagnostic error codes.

After block 842 (or in response to performing the clear drivetrain codes of block 842), the smart dongle 320 may proceed to determine end operation group with success. For instance, the smart dongle 320 may proceed to a next operation group (if more operation groups), or to report re-programming was successful to a user, e.g., via a user device (if no more operation groups).

At block 846, the smart dongle 320 may determine end operation group with failure. For instance, the smart dongle 320 may determine if any one branch routes to block 846 that the operation group failed in re-programming the target module and report the result to the user device.

In this manner, if the smart dongle 320 determines success at for certain operations, in a defined sequence of an operation group, the smart dongle 320 may end an operation group with success (e.g., thereby re-programming the target module). Moreover, while not depicted, even if for certain blocks the smart dongle 320 determines failure for an operation, the smart dongle 320 may proceed through recovery and failure operations (and if successful) determine an operation group was successful. Thus, recovery and failure operations may provide resiliency when performing operations with a target module. This may be important when target modules are listening to noisy communication channels, are sensitive to timing or packet size, or are locked in difficult modes of re-programming.

For instance, the smart dongle 320 may implement software code (using a programming language supported by the smart dongle 320) in accordance with the following pseudo code:

```
bool HandleOperations(Operations[ ] ops)
{
  for each (op in ops)
  {
    var result=op.Invoke( );
    if(!result.Success && op.FailureOperations!=null)
      return
    AttemptUntilSuccess(HandleOperations(op.FailureOperations), op.Attempts);
    if(result.Response.Length>0           &&
      result.Response!=op.ExpectedResponse)
      return false;
    return result.Success;
  }
}
bool  AttemptUntilSuccess(Action<bool>  process,  int attempts)
{
  int actualAttempts=0;
  while(attempts>actualAttempts)
  {
    if(process( ))
      return true;
    else
      actualAttempts++;
  }
  return false;
}
```

The provided pseudo-code defines two functions, HandleOperations and AttemptUntilSuccess, which may be used to execute a sequence of operations and handle potential failures during the execution process.

The HandleOperations function takes an array of operations as its input. It iterates through each operation in the array and invokes it. Invoke may be a function to perform any one or combinations of: sending a message, performing a multiple message process, prompting user for action, or simply waiting for a time period, as determined in accordance with the operation group (which may defined by the mapping-and-byte data for a re-program file). The invocation of an operation is expected to return a result object that contains a Success property indicating whether the operation was successful, and a Response property that may contain a response string from the operation.

If the operation is not successful and there are defined failure operations associated with it, the function attempts to execute these failure operations recursively by calling itself with the failure operations as the new set of operations to be handled. This is done until success is achieved or a predefined number of attempts is reached.

If the operation is successful but the response does not match the expected response, the function returns false, indicating a failure in the operation sequence. If the operation is successful and either there is no response or the response matches the expected response, the function returns true, indicating success for that particular operation.

The AttemptUntilSuccess function is a helper function that takes a process (in the form of an action that returns a boolean) and an integer representing the number of attempts to perform the process. The function executes the process in a loop until it returns true (indicating success) or until the number of actual attempts reaches the specified number of attempts.

If the process is successful within the allowed number of attempts, the function returns true. If the process continues to fail after the specified number of attempts, the function returns false, indicating that the process could not be completed successfully within the allowed attempts.

Overall, these functions work together to ensure that a sequence of operations is executed, and in case of any failures, appropriate recovery or failure operations are attempted to achieve a successful outcome.

Thus, the software code may reclusively loop through a set of operations and, for each operation selected from the set of operations, perform an invoke function for that operation. Based on a result of the invoke function for that operation selected from the set of operations, the software code may return different results based on a result state (success or failure) and if failure operations are available. For instance, if the result is not success (e.g., failure) and there are failure operations, the software code may call a retry loop function to perform failure operations in a recursive loop. For instance, if the result is a string with a length greater than zero and the result does not equal an expected result, the software code may return a false value (e.g., failure for that operation). For instance, if the result is a string with a length greater than zero and the result does equal an expected result (or as an end return branch if first two conditions are not satisfied), the software code may return a successful result value (e.g., success for that operation).

Computer System

Figure 9:
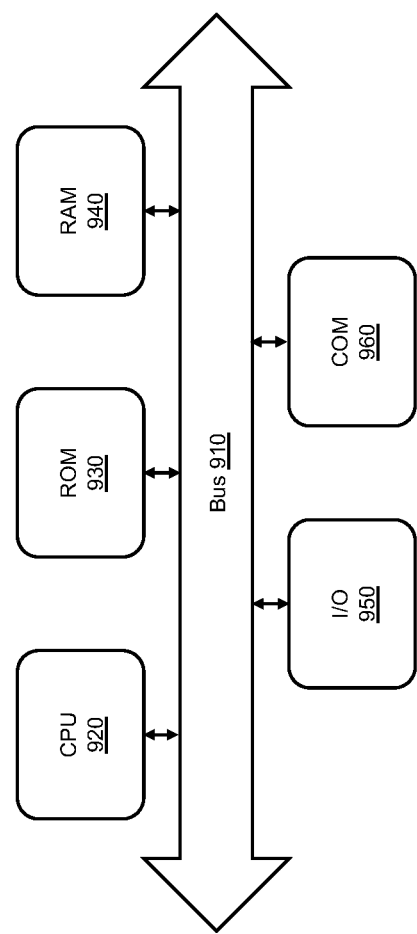
FIG. 9 depicts an example system that may execute techniques presented herein.

FIG. 9 depicts an example system that may execute techniques presented herein. FIG. 9 is a simplified functional block diagram of a computer that may be configured to execute techniques described herein, according to exemplary cases of the present disclosure. Specifically, the computer (or "platform" as it may not be a single physical computer infrastructure) may include a data communication interface 960 for packet data communication. The platform may also include a central processing unit 920 ("CPU 920"), in the form of one or more processors, for executing program instructions. The platform may include an internal communication bus 910, and the platform may also include a program storage and/or a data storage for various data files to be processed and/or communicated by the platform such as ROM 930 and RAM 940, although the system 900 may receive programming and data via network communications. The system 900 also may include input and output ports 950 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical, and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Examples

Exemplary embodiments of the systems and methods disclosed herein are described in the numbered paragraphs below.

A1. A system for staging data and updating vehicle modules using staged data, the system comprising:
  a user interface device, wherein the user interface device is configured to:
    receive and store a re-program file from a server; and
    display a graphical user interface configured to receive a user input to initiate a re-program process for at least one onboard module of a vehicle; and
  a programming device configured to be physically and communicably coupled to an onboard port of the vehicle,
    wherein the onboard port is configured to be communicably coupled with the at least one onboard module,
    the programming device is configured to be communicably coupled, via a wired or wireless communication, to the user interface device, and the programming device is configured to:
    receive, via a defined sequence of messages with the user interface device, and store, via defined operations with a local cache, one or combinations of: data checksum map metadata, protocol map metadata, data checksum map information, protocol map information, and a data map (collectively, mapping-and-byte data);
    in response to receiving an instruction message from the user interface device, re-program the at least one onboard module using the mapping-and-byte data; and in response to determining a checksum condition is satisfied, transmit a re-program success message to the user interface device.

A2. The system of claim 1, wherein the defined sequence of messages provides specific portions of the re-program file, so that the defined operations may store relevant data.

A3. The system of claim 2, wherein the defined operations ensure data integrity of byte-strings, so that when the programming device communicates write instructions to a target module of the at least one onboard module, the byte-strings are provided in a manner that reduces damage to vehicle modules/systems.

A4. The system of claim 3, wherein the defined operations perform additional checksums with each byte-string, in addition to communication level message checksums.

A5. The system of claim 1, wherein the programming device loads and verifies at least portions of the mapping-and-byte data in a processor from the local cache.

A6. The system of claim 5, wherein the programming device, via the processor as loaded with the at least portions of the mapping-and-byte data, re-programs a target module of the at least one onboard module via messages.

A7. The system of claim 6, wherein the target module writes new data in accordance with messages from the programming device, requests responses, or provides feedback.

A8. The system of claim 7, wherein the feedback is a checksum generated in response to writing the new data.

A9. The system of claim 8, wherein the programming device is configured to respond in programmatic operations in response to the requests for response or the feedback, or absence thereof.

A10. The system of claim 1, wherein the checksum condition is satisfied when checksums of the data checksum map information match checksums provided by (1) a processor of the programming device or (2) the at least one onboard module.

A11. The system of claim 1, wherein a re-program success interface is displayed on the user interface device in response to receiving the re-program success message.

A12. The system of claim 1, wherein the re-program file is generated and tested by engineers associated with the server.

A13. The system of claim 4, wherein the server is configured to manage re-program files including the re-program file; store re-program files in datastores; and serve re-program files to user interface devices including the user interface device.

A14. The system of claim 1, wherein the re-program file is selected based on a user request for a specific type of action/performance, vehicle, and/or module.

A15. The system of claim 1, wherein the re-program file is updated to form a updated re-program file, and the updated re-program file is transmitted to user interface devices including the user interface device, so that user interface devices are ready to re-program modules of vehicles.

A16. The system of claim 1, wherein the graphical user interface instructs a user on how to set up the user interface device and the programming device to complete a module re-program.

A17. The system of claim 1, wherein the graphical user interface instructs a user on how to engage the programming device with a port or connect the user interface device and the programming device using Bluetooth low energy.

A18. The system of claim 1, wherein the server includes a file manager, the file manager is configured to generate, update, and send re-programming files to user interface devices, including the user interface device, and/or an alert to the user interface devices regarding installed re-programming files.

A19. The system of claim 1, wherein, to re-program the at least one onboard module using the mapping-and-byte data, the programming device is configured to start an operation queue.

A20. The system of claim 19, wherein the programming device is configured to determine whether the operation queue is empty.

A21. The system of claim 20, wherein the programming device is configured to, in response to determining the operation queue is empty, report successful re-programming.

A22. The system of claim 20, wherein the programming device is configured to, in response to determining the operation queue is not empty, select an operation from the operation queue.

A23. The system of claim 22, wherein the programming device is configured to, in accordance with the selected operation, send a message or wait a defined amount of time.

A24. The system of claim 22, wherein the programming device is configured to determine whether to send a confirm response.

A25. The system of claim 24, wherein the programming device is configured to determine whether to send the confirm response in accordance with the selected operation.

A26. The system of claim 23, wherein the programming device is configured to determine whether a confirm response matches an expected actual response.

A27. The system of claim 25, wherein the programming device is configured to, in response to determining the confirm response does not match the expected actual response, determine whether there are failure operations.

A28. The system of claim 27, wherein the programming device is configured to, in response to determining there are failure operations, start an operation group for failure operations.

A29. The system of claim 25, wherein the programming device is configured to, in response to determining there are not failure operations, report failure.

A30. The system of claim 1, wherein the programming device is configured to receive a data message from the user interface device to initiate a loading process of a processor of the programming device.

A31. The system of claim 30, wherein the programming device is configured to, in response to receiving the data message, load and verify data from the local cache into the processor.

A32. The system of claim 31, wherein the programming device is configured to determine whether all data for an instruction has been received.

A33. The system of claim 32, wherein the programming device is configured to buffer data, in the processor, until all the data for the instruction is received.

A34. The system of claim 33, wherein the programming device is configured to determine whether an instruction checksum matches a map checksum for the instruction.

A35. The system of claim 34, wherein the programming device is configured to write the instruction to a processor address using the protocol map and the data map.

A36. The system of claim 35, wherein the programming device is configured to determine if data was successfully written to the processor address.

A37. The system of claim 36, wherein the programming device is configured to determine if protocol map instructions are completed.

A38. The system of claim 37, wherein the programming device is configured to determine if message checksums match.

A39. The system of claim 38, wherein the programming device is configured to, in response to (1) the data was successfully written to the processor address, (2) the protocol map instructions are complete and (3) the message checksums match, transmit a confirmation/success message.

A40. The system of claim 39, wherein the user interface device is configured to receive the confirmation/success message, and, in response receiving the confirmation/success message, output a user interface that indicates a re-program process is ready to proceed.

A41. The system of claim 1, wherein the programming device is configured to receive a data map message from the user interface device to initiate receipt of the data map.

A42. The system of claim 41, wherein the programming device is configured to reset variables and update a flashing state in response to receiving the data map message.

A43. The system of claim 42, wherein the programming device is configured to write data to the local cache.

A44. The system of claim 43, wherein the programming device is configured to determine whether all data for the data map has been received.

A45. The system of claim 44, wherein the programming device is configured to determine whether multiple checksums match.

A46. The system of claim 45, wherein the programming device is configured to, in response to determining that all data for the data map has been received and determining the multiple checksums match, transmit a confirmation/success message.

A47. The system of claim 46, wherein the user interface device is configured to receive the confirmation/success message, and the system is configured to, in response to the confirmation/success message, proceed to a data load process.

B1. A system for staging data and updating vehicle modules using staged data, the system comprising:
  a user interface device, wherein the user interface device is configured to:
    receive and store a re-program file from a server; and
    display a graphical user interface configured to receive a user input to initiate a re-program process for at least one onboard module of a vehicle; and
  a programming device configured to be physically and communicably coupled to an onboard port of the vehicle,
    wherein the onboard port is configured to be communicably coupled with the at least one onboard module,
    the programming device is configured to be communicably coupled, via a wired or wireless communication, to the user interface device, and the programming device is configured to:
      receive, via a defined sequence of messages with the user interface device, and store, via defined operations with a local cache, one or combinations of: data checksum map metadata, protocol map metadata, data checksum map information, protocol map information, and a data map (collectively, mapping-and-byte data);
      in response to receiving an instruction message from the user interface device, re-program the at least one onboard module using the mapping-and-byte data; and
      in response to determining a checksum condition is satisfied, transmit a re-program success message to the user interface device.

B2. The system of B1, wherein, to re-program the at least one onboard module using the mapping-and-byte data, the programming device is configured to perform a sequence of operations for an operation group in accordance with the mapping-and-byte data, wherein the sequence of operations includes a plurality of operations; determine whether each operation of the plurality of operations was successful; and, in response to determining an operation was not successful, perform a corresponding recovery operation or failure operation.

B3. The system of B2, wherein the plurality of operations includes at least a first operation and a second operation, and the first operation is performed before the second operation.

B4. The system of B3, wherein the second operation is performed in response to determining the first operation being successful.

B5. The system of B3, wherein, to determine the first operation was successful, the programming devices is configured to perform the first operation and determine whether a response from the target module matches an expected response.

B6. The system of B3, wherein the programming device is configured to, in response to determining the first operation was not successful, determine an end of the operation group as a failure.

B7. The system of B3, wherein the programming device is configured to, in response to determining the first operation was not successful, perform a recovery operation associated with the first operation.

B8. The system of B7, wherein the recovery operation is a first recovery operation, and the programming device is configured to, in response to determining the first recovery operation was not successful, perform a second recovery operation or determine an end of the operation group as a failure.

B9. The system of B7, wherein the programming device is configured to, in response to determining the recovery operation was successful, perform a failure operation associated with the recovery operation.

B10. The system of B9, wherein the programming device is configured to, in response to determining the failure operation was successful, proceed to the second operation in the sequence of operations.

B11. The system of B2, wherein the programming device is configured to, in response to determining a failure operation was not successful, report a failure of the operation group to the user interface device.

B12. The system of B1, wherein, to re-program the at least one onboard module using the mapping-and-byte data, the programming device is configured to perform a sequence of operations for an operation group in accordance with the mapping-and-byte data, wherein the sequence of operations includes a plurality of operations; determine whether each operation of the plurality of operations was successful; and, in response to determining each operation was successful, determine a re-programming was successful.

B13. The system of B12, wherein, to determine an operation was successful, the programming device is configured to: confirm whether a response to the performed operation matches an expected response.

B14. The system of B13, wherein an expected response is a confirmation message.

B15. The system of B13, wherein an expected response is a non-response.

B16. The system of B13, wherein an expected response is a delayed response.

B17. The system of B13, wherein an expected response is a checksum.

B18. The system of B12, wherein the plurality of operations include one or combinations of: a clear drivetrain codes operation, a check prepogram conditions operation, an enter programming mode operation, an update fingerprint operation, a set download location and size operation, a transfer data operation, a validate transfer operation, a transfer areas determination operation, an exit programming operation, and/or a reset module operation.

B19. The system of B18, wherein the programming device is configured to perform the check preprogram conditions operation in response to determining that a response from the at least one onboard module was acceptable following the clear drivetrain codes operation.

B20. The system of B18, wherein the programming device is configured to perform the enter programming mode operation in response to determining that a response from the at least one onboard module was acceptable following the check preprogram conditions operation.

B21. The system of B18, wherein the programming device is configured to perform the update fingerprint operation in response to determining that a response from the at least one onboard module was acceptable following the enter programming mode operation.

B22. The system of B18, wherein the programming device is configured to perform the set download location and size operation in response to determining that a response from the at least one onboard module was acceptable following the update fingerprint operation.

B23. The system of B18, wherein the programming device is configured to perform the transfer data operation in response to determining that a response from the at least one onboard module was acceptable following the set download location and size operation.

B24. The system of B18, wherein the programming device is configured to perform the validate transfer operation in response to determining that a response from the at least one onboard module was acceptable following the transfer data operation.

B25. The system of B18, wherein the programming device is configured to perform the transfer areas determination operation in response to determining that a response from the at least one onboard module was acceptable following the validate transfer operation.

B26. The system of B18, wherein the programming device is configured to perform the set download location and size operation in response to the transfer areas determination operation determining more areas.

B27. The system of B18, wherein the programming device is configured to perform the exit programming operation in response to the transfer areas determination operation determining no more areas.

B28. The system of B18, wherein the programming device is configured to perform the reset module operation in response to determining that a response from the at least one onboard module was acceptable following the exit programming operation.

B29. The system of B18, wherein the programming device is configured to perform the clear drivetrain codes operation in response to determining that a response from the at least one onboard module was acceptable following the reset module operation or in response to starting the operation group.

B30. The system of B18, wherein the programming device is configured to end the operation group with success in response to determining that a response from the at least one onboard module was acceptable following the clear drivetrain codes operation.

B31. The system of B12, wherein the plurality of operations include one or combinations of: sending a message, performing a multiple message process, prompting a user for an action, or waiting for a time period.

B32. The system of B12, wherein the programming device is configured to recursively loop through the plurality of operations, including the operations in sequence and, if an operation fails, through any recovery or failure operations until the operation group is successful or until a predetermined number of attempts have been made.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for staging data and updating vehicle modules using staged data, the system comprising:
    a user interface device, wherein the user interface device is configured to:
        receive and store a re-program file from a server; and
        display a graphical user interface configured to receive a user input to initiate a re-program process for at least one onboard module of a vehicle; and
    a programming device configured to be physically and communicably coupled to an onboard port of the vehicle,
        wherein the onboard port is configured to be communicably coupled with the at least one onboard module,
        the programming device is configured to be communicably coupled, via a wired or wireless communication, to the user interface device, and
        the programming device is configured to:
            receive, via a defined sequence of messages with the user interface device, and store, via defined operations with a local cache, one or combinations of: data checksum map metadata, protocol map metadata, data checksum map information, protocol map information, and a data map (collectively, mapping-and-byte data);
            in response to receiving an instruction message from the user interface device, re-program the at least one onboard module using the mapping-and-byte data; and
            in response to determining a checksum condition is satisfied, transmit a re-program success message to the user interface device.

2. The system of claim 1, wherein, to re-program the at least one onboard module using the mapping-and-byte data, the programming device is configured to perform a sequence of operations for an operation group in accordance with the mapping-and-byte data, wherein the sequence of operations includes a plurality of operations; determine whether each operation of the plurality of operations was successful; and, in response to determining an operation was not successful, perform a recovery operation or a failure operation.

3. The system of claim 2, wherein the plurality of operations includes at least a first operation and a second operation, and the first operation is performed before the second operation.

4. The system of claim 3, wherein the second operation is performed in response to determining the first operation being successful.

5. The system of claim 3, wherein, to determine the first operation was successful, the programming device is configured to perform the first operation and determine whether a response from the at least one onboard module matches an expected response.

6. The system of claim 3, wherein the programming device is configured to, in response to determining the first operation was not successful, determine an end of the operation group as a failure.

7. The system of claim 3, wherein the programming device is configured to, in response to determining the first operation was not successful, perform a recovery operation associated with the first operation.

8. The system of claim 7, wherein the recovery operation is a first recovery operation, and the programming device is configured to, in response to determining the first recovery operation was not successful, perform a second recovery operation or determine an end of the operation group as a failure.

9. The system of claim 3, wherein the programming device is configured to, in response to determining the recovery operation was successful, perform a failure operation associated with the recovery operation.

10. The system of claim 3, wherein the programming device is configured to, in response to determining the failure operation was successful, proceed to the second operation in the sequence of operations.

11. The system of claim 2, wherein the programming device is configured to, in response to determining a failure operation was not successful, report a failure of the operation group to the user interface device.

12. The system of claim 1, wherein, to re-program the at least one onboard module using the mapping-and-byte data, the programming device is configured to perform a sequence of operations for an operation group in accordance with the mapping-and-byte data, wherein the sequence of operations includes a plurality of operations; determine whether each operation of the plurality of operations was successful; and, in response to determining each operation was successful, determine a re-programming was successful.

13. The system of claim 12, wherein, to determine an operation was successful, the programming device is configured to: confirm whether a response to the operation matches an expected response.

14. The system of claim 13, wherein an expected response is a confirmation message.

15. The system of claim 13, wherein an expected response is a non-response or a delayed response.

16. The system of claim 13, wherein an expected response is a checksum.

17. The system of claim 13, wherein the plurality of operations include one or combinations of: sending a message, performing a multiple message process, prompting a user for an action, or waiting for a time period.

18. The system of claim 13, wherein the programming device is configured to recursively loop through the plurality of operations, including the plurality of operations in sequence and, if an operation fails, through any recovery or failure operations until the operation group is successful or until a predetermined number of attempts have been made.

* * * * *